(12) United States Patent
Maeda et al.

(10) Patent No.: US 11,780,752 B2
(45) Date of Patent: Oct. 10, 2023

(54) ION-EXCHANGE RESIN REGENERATION SYSTEM

(71) Applicant: Panasonic Intellectual Property Management Co., Ltd., Osaka (JP)

(72) Inventors: Yasunari Maeda, Osaka (JP); Tomohiro Akita, Osaka (JP); Ayane Takehisa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 68 days.

(21) Appl. No.: 17/050,481

(22) PCT Filed: Jun. 24, 2019

(86) PCT No.: PCT/JP2019/024963
§ 371 (c)(1),
(2) Date: Oct. 26, 2020

(87) PCT Pub. No.: WO2020/039731
PCT Pub. Date: Feb. 27, 2020

(65) Prior Publication Data
US 2021/0238060 A1    Aug. 5, 2021

(30) Foreign Application Priority Data

Aug. 24, 2018   (JP) ................... 2018-157646

(51) Int. Cl.
*C02F 1/42* (2023.01)
*B01J 49/53* (2017.01)
(Continued)

(52) U.S. Cl.
CPC ............. *C02F 1/42* (2013.01); *B01J 49/53* (2017.01); *C02F 1/5281* (2013.01); *C02F 5/02* (2013.01);
(Continued)

(58) Field of Classification Search
None
See application file for complete search history.

(56) References Cited

U.S. PATENT DOCUMENTS 3,528,912 A    9/1970  Popper et al.
4,452,599 A *  6/1984  Albisser ............. F04B 43/1292
                                                        604/153
(Continued)

FOREIGN PATENT DOCUMENTS

AU    2010357340        1/2012
CA    2291507 A1 *     6/2000  ............... C02F 9/00
(Continued)

OTHER PUBLICATIONS

Extended European Search Report for corresponding Application No. 19852544.6 dated Sep. 10, 2021.
(Continued)

*Primary Examiner* — Chester T Barry
(74) *Attorney, Agent, or Firm* — Renner, Otto, Boisselle & Sklar, LLP

(57) ABSTRACT

An ion-exchange resin regeneration system includes: salt water flowing means that flows an aqueous sodium chloride solution or an aqueous potassium chloride solution into a container storing ion-exchange resin; and hard water component crystallizing means that crystallizes and removes hard water components containing metal ions from drained water arising from the ion-exchange resin through which the aqueous sodium chloride solution or the aqueous potassium chloride solution has flowed.

2 Claims, 15 Drawing Sheets

(51) Int. Cl.
  *C02F 1/52* (2023.01)
  *C02F 5/02* (2023.01)
(52) U.S. Cl.
  CPC .................. *C02F 2001/425* (2013.01); *C02F 2001/5218* (2013.01); *C02F 2303/16* (2013.01)

(56) References Cited

U.S. PATENT DOCUMENTS

| | | | |
|---|---|---|---|
| 2004/0134796 A1* | 7/2004 | Shelp | B01J 49/70 205/755 |
| 2005/0000902 A1* | 1/2005 | Newenhizen | B01D 3/346 210/96.1 |
| 2008/0116134 A1* | 5/2008 | Cartwright | C02F 1/442 210/744 |
| 2014/0238942 A1* | 8/2014 | Nicolas | C01D 3/16 210/726 |

FOREIGN PATENT DOCUMENTS

| | | | | |
|---|---|---|---|---|
| EP | 3590894 | A1 | | 1/2020 |
| JP | S62-282647 | A | | 12/1987 |
| JP | 2000-140840 | A | | 5/2000 |
| JP | 2000140840 | A | * | 5/2000 |
| JP | 2009-022901 | A | | 2/2009 |
| JP | 2009022901 | A | * | 2/2009 |
| JP | 2010223525 | A | | 10/2010 |
| JP | 2014-076421 | A | | 5/2014 |
| JP | 2014076421 | A | * | 5/2014 |
| JP | 5673225 | B2 | | 1/2015 |
| JP | 5673225 | B2 | | 2/2015 |
| KR | 1020110058972 | | | 6/2011 |
| WO | 2012/008013 | A1 | | 1/2012 |
| WO | WO-2012008013 | A1 | * | 1/2012 ............ B01D 3/007 |
| WO | 2012/008013 | A1 | | 9/2013 |
| WO | 2018/159693 | A1 | | 9/2018 |
| WO | 2018/159693 | A1 | | 12/2019 |

OTHER PUBLICATIONS

Jun-Hwan Bang et al., "Precipitation of calcium carbonate by carbon dioxide microbubbles", Chemical Engeneering Journal, vol. 174, No. 1, Sep. 2, 2011, pp. 413-420.
Office Action for corresponding Japanese Application No. 2018-157646 dated Jul. 5, 2022 and its English Machine Translation.
International Preliminary Report on Patentability for corresponding Application No. PCT/JP2019/024963, English Translation dated Mar. 11, 2021.
International Search Report for corresponding Application No. PCT/JP2019/024963, dated Sep. 10, 2019.
First Examination Report for corresponding Indian Application No. 202017045869 dated Dec. 2, 2021.
Office Action and Search Report for corresponding Chinese Application No. 201980029262.1 dated Sep. 26, 2022, including English Translation of Search Report.
Office Action and Search Report for corresponding Chinese Application No. 201980029262.1 dated Feb. 18, 2023, including English Translation of Search Report.
Office Action and Search Report for corresponding Chinese Application No. 201980029262.1 dated Jun. 1, 2023, including Machine English Translation and Human English Translation of Search Report.
The Application of Micro-Bubbles for Dissolution and Crystallization of Calcium Carbonate in Gas-Liquid-Solid System, Masakazu Matsumoto, Bulletin of the Society of Sea Water Science, vol. 58, Issue 5, pp. 475-486 (2004).

* cited by examiner

ION-EXCHANGE RESIN REGENERATION SYSTEM

CROSS-REFERENCE TO RELATED APPLICATIONS

This application claims a priority of Japanese Patent Application No. 2018-157646 filed on Aug. 24, 2018, the contents of which is incorporated herein by reference.

BACKGROUND OF THE INVENTION

1. Field of the Invention

The present invention relates to an ion-exchange resin regeneration system for regenerating ion-exchange resin.

2. Description of the Related Art

An ion removal device using ion-exchange resin for removing metal ions in hard water has hitherto been disclosed, as shown in Japanese Laid-Open Patent Publication No. 2000-140840.

The ion removal device of Japanese Laid-Open Patent Publication No. 2000-140840 removes metal ions (calcium ion and magnesium ion) in hard water by ion-exchange resin. Specifically, by allowing hard water to flow into a treatment vessel that contains ion-exchange resin with a surface to which sodium ions are adhered, metal ions in hard water are replaced with sodium ions, thereby removing metal ions from hard water. In consequence, hardness of hard water lowers so that soft water is produced. Metal ions present in hard water are captured on the surface of ion-exchange resin.

SUMMARY

However, the ion removal device of Japanese Laid-Open Patent Publication No. 2000-140840 needs a large volume of salt water in order to regenerate ion-exchange resin that has captured metal ions, resulting in a problem that maintenance takes time. Also, when regeneration treatment is performed, there occurs drained water of salt water containing calcium ions, leading to a problem of increased load of soil pollution and sewage treatment.

In this manner, for regeneration of ion-exchange resin, there was room for improvement in terms of maintainability and environmental friendliness.

It is therefore one non-limiting and exemplary embodiment provides an ion-exchange resin regeneration system excellent in maintainability and environmental friendliness.

In one general aspect, the techniques disclosed here feature: an ion-exchange resin regeneration system includes:

salt water flowing means that flows an aqueous sodium chloride solution or an aqueous potassium chloride solution into a container storing ion-exchange resin; and hard water component crystallizing means that crystallizes and removes hard water components containing metal ions from drained water arising from the ion-exchange resin through which the aqueous sodium chloride solution or the aqueous potassium chloride solution has flowed.

According to the present invention, an ion-exchange resin regeneration system superior in maintainability and environmental friendliness can be provided.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

The present disclosure will become readily understood from the following description of non-limiting and exemplary embodiments thereof made with reference to the accompanying drawings, in which like parts are designated by like reference numeral and in which.

DETAILED DESCRIPTION

<Problem in Ion-Exchange Resin Regeneration Treatment>

Figure 2A:
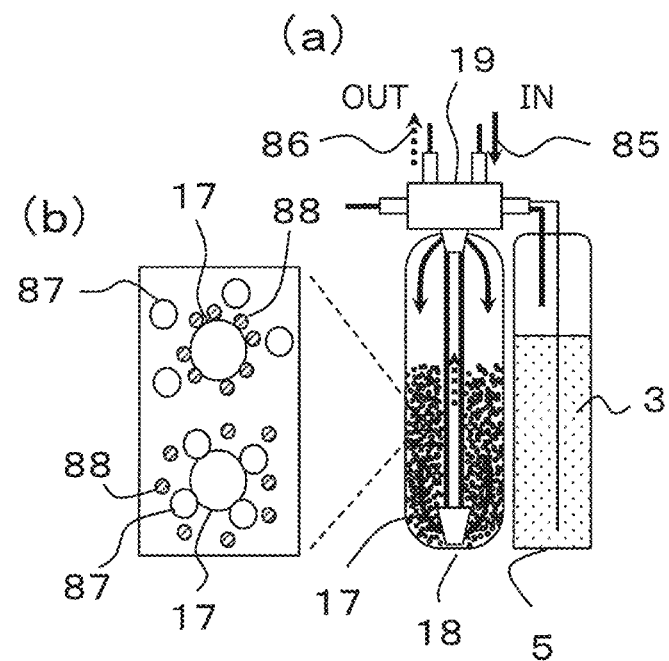
FIG. 2A is a schematic view showing a water softening treatment in ion-exchange resin.

FIG. 2A is a schematic view showing a water softening treatment in an ion-exchange resin 17.

Figure 2B:
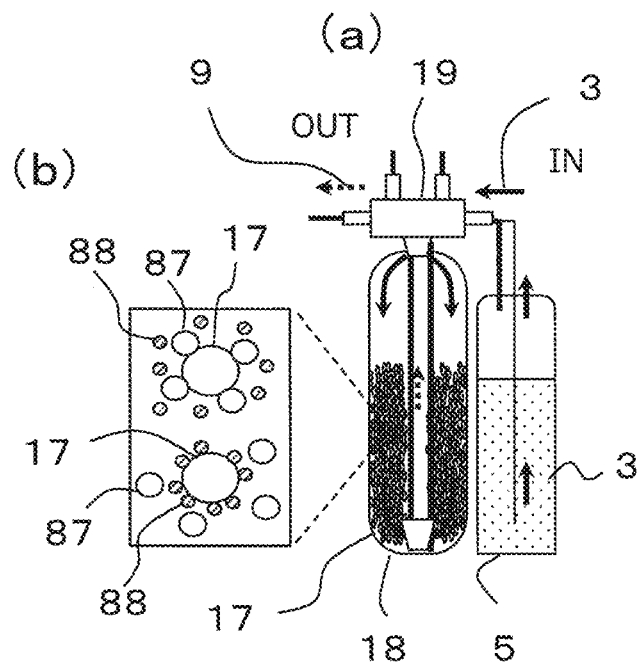
FIG. 2B is a schematic view showing a regeneration treatment in which salt water is flowed through the ion-exchange resin.

FIG. 2B is a schematic view showing a regeneration treatment in which salt water is flowed through the ion-exchange resin 17.

A problem in ion-exchange resin regeneration treatment will hereinbelow be described.

(Water Softening Treatment)

As shown in FIG. 2A(a), at the time of water softening treatment, hard water 85 is introduced into an ion-exchange resin container 18 storing ion-exchange resin 17. When hard water 85 comes into contact with ion-exchange resin 17, as shown in the upper half of FIG. 2A(b), sodium ions 88 on the surface of ion-exchange resin 17 are replaced with calcium ions 87 in hard water 85. In consequence, as shown in the lower half of FIG. 2A(b), calcium ions 87 are adsorbed on the surface of ion-exchange resin 17 so that soft water 86 with a lowered hardness are drawn from ion-exchange resin 17. In this manner, in ion-exchange resin 17, water softening is carried out by replacing sodium ions 88 on the surface thereof with calcium ions 87. For this reason, ion exchange performance deteriorates when the replacement proceeds. For that reason, regeneration treatment shown in FIG. 2B becomes necessary.

(Regeneration Treatment)

As shown in FIG. 2B(a), at the time of regeneration treatment, salt water 3 e.g. an aqueous sodium chloride solution or an aqueous potassium chloride solution stored in a salt water tank 5 is flowed into the ion-exchange resin container 18 that houses ion-exchange resin 17. Incidentally, a control valve 19 may be used to perform flow path switching at the time of introducing hard water 85 and drawing soft water 86 and at the time of introducing salt water 3 and discharging drained water. When salt water 3 comes into contact with ion-exchange resin 17, as shown in the upper half of FIG. 2B(b), calcium ions 87 adsorbed on the surface of ion-exchange resin 17 are replaced with sodium ion 88 (or potassium ions). Consequently, as shown in the lower half of FIG. 2B(b), calcium ions adsorbed on the surface of ion-exchange resin 17 are released into salt water so that sodium ions 88 are adsorbed on the surface of ion-exchange resin 17 for regeneration of ion-exchange resin.

Note that drained water 9 discharged from ion-exchange resin 17 contains calcium ions in salt water. For this reason, it cannot be used for next ion-exchange resin regeneration treatment. Moreover, there was a problem that since drained water 9 is hard water containing sodium ions, it cannot be released intactly into river, etc.

As a result of earnest study, the inventors of this application discovered findings that metal ion removal can be promoted by using "fine bubbles" that has not been used until now in the ion removal technique (water softening technique) removing metal ions from hard water such as drained water after ion-exchange resin regeneration treatment, and arrived at the invention of embodiments. Above all, we found out that the metal ion removal effect can further be promoted by changing the type of gas that is a source of fine bubbles, and arrived at the present invention.

Incidentally, it was found out that hard water components can be removed from the above drained water also by projecting into drained water a chemical agent producing anions that produce hardly soluble salt with metal ions contained in hard water such as drained water after ion-exchange resin regeneration treatment.

An ion-exchange resin regeneration system according to a first aspect includes:

salt water flowing means that flows an aqueous sodium chloride solution or an aqueous potassium chloride solution into a container storing ion-exchange resin; and hard water component crystallizing means that crystallizes and removes hard water components containing metal ions from drained water arising from the ion-exchange resin through which the aqueous sodium chloride solution or the aqueous potassium chloride solution has flowed.

The ion-exchange resin regeneration system according to a second aspect, in the first aspect, wherein the hard water component crystallizing means includes:

an ion removal device that generates fine bubbles and supplies the fine bubbles into the drained water, to thereby allow metal ions in the drained water to be adsorbed on the fine bubbles.

The ion-exchange resin regeneration system according to a third aspect, in the first aspect, wherein the hard water component crystallizing means includes:

chemical agent projecting means that projects into the drained water a chemical agent that produces anions producing hardly soluble salt with metal ions contained the hard water.

The ion-exchange resin regeneration system according to a fourth aspect, in the first aspect, further includes:

separating means that separates crystals of hard water components crystallized and precipitated.

First to third embodiments according to the present invention will hereinafter be described in detail based on the drawings.

First Embodiment

<Ion-Exchange Resin Regeneration System>

Figure 1:
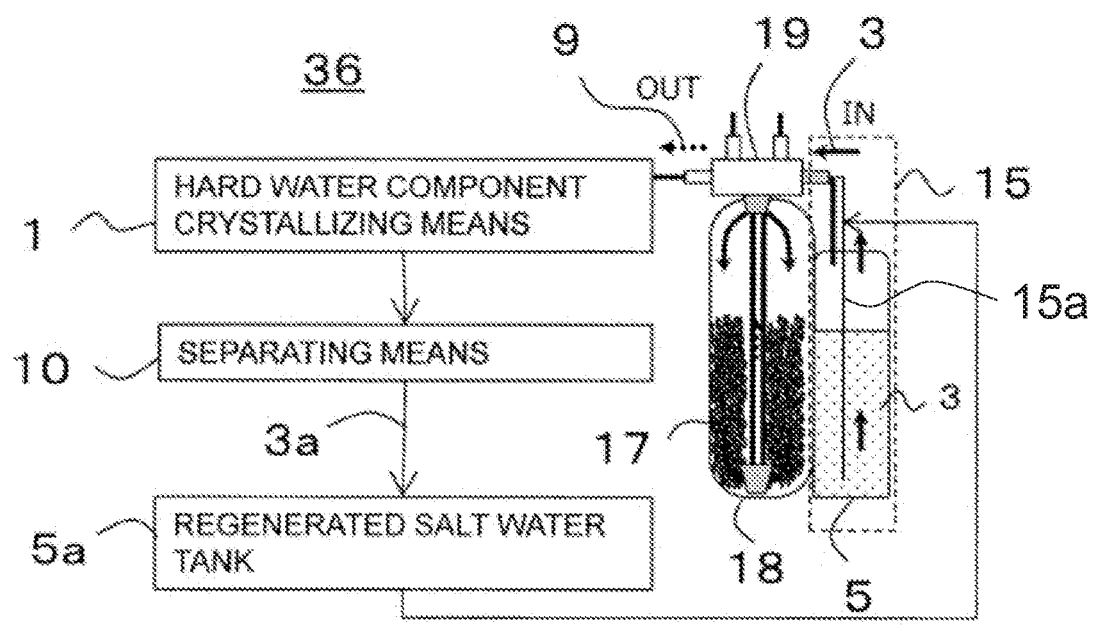
FIG. 1 is a schematic view showing a configuration of an ion-exchange resin regeneration system according to a first embodiment.

FIG. 1 is a schematic view showing a configuration of an ion-exchange resin regeneration system 36 according to the first embodiment. This ion-exchange resin regeneration system 36 includes salt water flowing means 15 and hard water component crystallizing means 1. The salt water flowing means 15 e.g., tube 15a, flows salt water 3 that is an aqueous sodium chloride solution or an aqueous potassium chloride solution into an ion-exchange resin container 18 that houses ion-exchange resin 17. The hard water component crystallizing means 1 crystallizes and removes a hard water component containing metal ions from drained water 9 originating from the ion-exchange resin 17 through which the aqueous sodium chloride solution or the aqueous potassium chloride solution has flowed.

This enables the hard water component containing metal ions to be crystallized and removed from the drained water 9 after a regeneration treatment of the ion-exchange resin 17, so that regenerated salt water 3a from the drained water 9 can be obtained or drained water after the treatment can be drained off as it is.

The above hard water component crystallizing means 1 may be e.g. chemical agent projecting means 16 that projects into the drained water 9 a chemical agent that produces an anion that produces hardly soluble salt with the metal ions contained in the hard water component. Alternatively, the above hard water component crystallizing means 1 may be an ion removal device 2 that generates fine bubbles to supply the fine bubbles into the drained water 9 to thereby allow the fine bubbles to adsorb the metal ions within the drained water 9.

As shown in FIG. 1, separating means 10 may further be disposed that separates crystals of the hard water component crystallized and precipitated. The regenerated salt water 3a from the drained water 9 may be stored in a regenerated salt water tank 5a. Alternatively, the regenerated salt water 3a may be returned to the salt water tank 5.

<Chemical Agent Projecting Means>

Figure 3A:
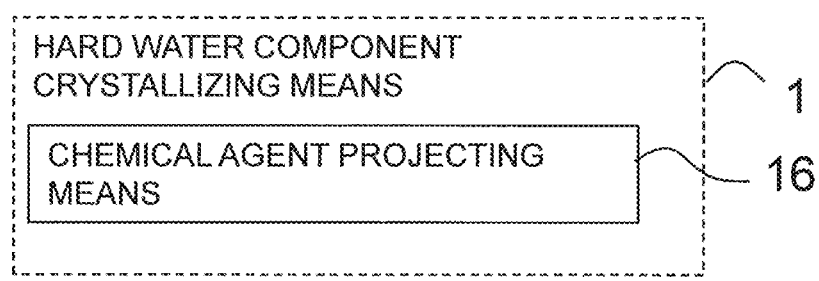
FIG. 3A is a schematic view showing that hard water component crystallizing means includes chemical agent projecting means.

FIG. 3A is a schematic view showing that hard water component crystallizing means 1 includes the chemical agent projecting means 16. The metal ions contained in the hard water component are a calcium ion ($Ca^{2+}$) and a magnesium ion ($Mg^{2+}$). The chemical agent that produces an anion that produces hardly soluble salt with these metal ions is, e.g. sodium hydrogen carbonate ($NaHCO_3$: baking soda) or potassium hydrogen carbonate ($KHCO_3$). The chemical agent projecting means 16 may be for example one that sprinkles the above chemical agent e.g. sodium hydrogen carbonate ($NaHCO_3$: baking soda) or potassium hydrogen carbonate ($KHCO_3$) in powder form, into the drained water 9.

When sodium hydrogen carbonate ($NaHCO_3$: baking soda) or potassium hydrogen carbonate ($KHCO_3$) is projected into the drained water 9 by this chemical agent projecting means 16, sodium hydrogen carbonate dissociates into a sodium ion ($Na^+$) and a hydrogen carbonate ion ($HCO_3^-$). Potassium hydrogen carbonate dissociates into a potassium ion ($K^+$) and a hydrogen carbonate ion ($HCO_3^-$). An aqueous sodium hydrogen carbonate solution has a pH of about 8.3. By projecting sodium hydrogen carbonate or potassium hydrogen carbonate into the drained water 9, calcium ions in the drained water 9 precipitate and separate as insoluble calcium carbonate.

<Ion Removal Device>

Figure 3B:
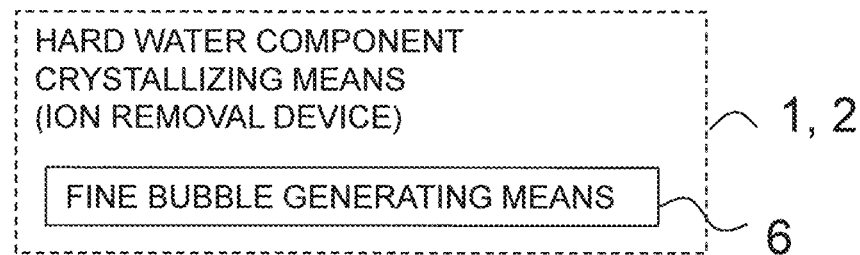
FIG. 3B is a schematic view showing that the hard water component crystallizing means includes an ion removal device.

FIG. 3B is a schematic view showing that the hard water component crystallizing means 1 includes the ion removal device 2.

This ion removal device 2 generates fine bubbles and supplies the fine bubbles into the drained water 9, thereby allowing the fine bubbles to adsorb the metal ions, e.g. calcium ions within the drained water 9. Afterward, the fine bubbles shrink so that the calcium ions precipitate and separate as insoluble calcium carbonate.

Details of this ion removal device 2 will be described below.

Figure 4:
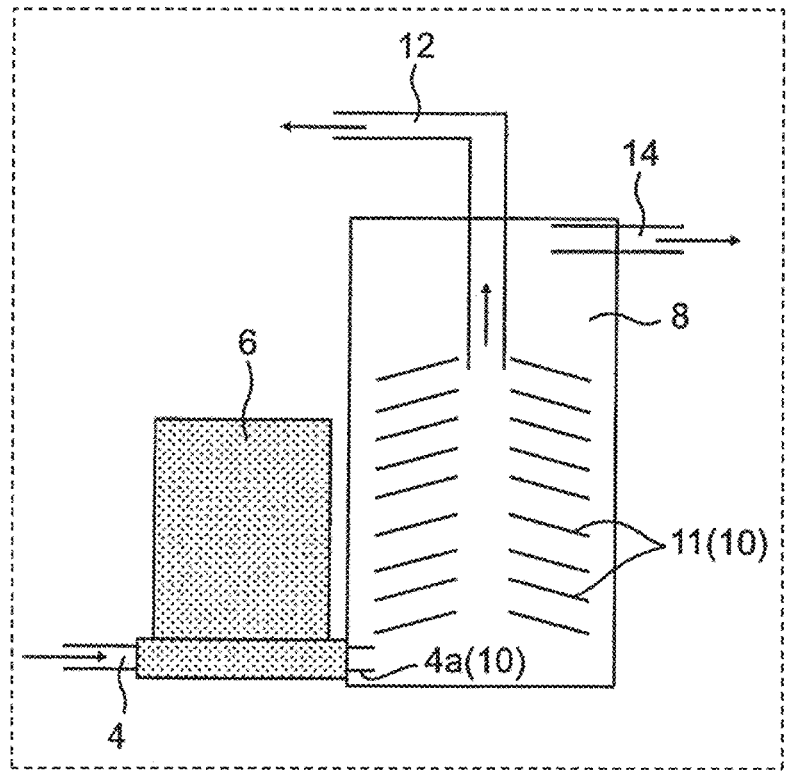
FIG. 4 is a schematic view of the ion removal device in the ion-exchange resin regeneration system according to the first embodiment.

FIG. 4 is a view showing a schematic configuration of the ion removal device 2 in the ion-exchange resin regeneration system 36 according to the first embodiment.

<Overall Configuration>

The ion removal device 2 is a device that removes metal ions from hard water such as the drained water 9. The metal ions in this case are a calcium ion ($Ca^{2+}$) and a magnesium ion ($Mg^{2+}$). The ion removal device 2 in the first embodiment is a water softener that produces soft water by removing and separating the metal ions from hard water to thereby lower the concentration (hardness) of the metal ions in hard water to a predetermined concentration or less.

As shown in FIG. 4, the ion removal device 2 in the first embodiment includes a hard water supply piping 4, fine bubble generating means 6, a treatment vessel 8, the separating means 10, a soft water drawing piping 12, and a separated water discharge piping 14.

The hard water supply piping 4 is a piping that supplies hard water. The hard water supply piping 4 is an example of hard water supplying means that supplies hard water. The drained water 9 of FIG. 1 is supplied to the hard water supply piping 4.

The fine bubble generating means 6 is means that generates fine bubbles. The fine bubble is a bubble of 100 μm or less in diameter. The fine bubble includes a microbubble (diameter of, e.g. 1 μm or more and 100 μm or less) and a nanobubble (diameter of e.g. less than 1 μm). The fine bubble has different properties from ordinary bubbles in e.g. that it has a long residence time in water and that it has a large contact area facilitating chemical reactions.

The fine bubble generating means 6 in the first embodiment is a device that is formed adjacent to the hard water supply piping 4 so as to allow direct supply of generated fine bubbles to the hard water supply piping 4.

The fine bubble generating means 6 in the first embodiment has a function of generating fine bubbles from one gas selected from plural types of gases. The fine bubble generating means 6 can select a fine bubble source from e.g. two gases, air and carbon dioxide to generate fine bubbles therefrom.

In a water softening treatment that softens water by supplying fine bubbles to hard water, the fine bubble generating means 6 in the first embodiment generates fine bubbles from "air" to supply to the hard water supply piping 4. Furthermore, in the regeneration treatment after the water softening treatment, the fine bubbles are generated from "carbon dioxide", not from air, to be supplied to the hard water supply piping 4.

By supplying air fine bubbles into hard water, although a specific principle will be described later, the fine bubbles can adsorb metal ions in hard water and the adsorbed metal ions can be crystallized and precipitated as metal components to be removed from hard water.

The treatment vessel 8 is a tank for further treating hard water to which fine bubbles have been supplied. The treatment vessel 8 is connected to a tip portion of the hard water supply piping 4. The treatment vessel 8 is provided with the separating means 10 (an end portion 4a and an adsorption plate 11), the soft water drawing piping 12, and the separated water discharge piping 14.

The separating means 10 is means for separating the crystallized and precipitated metal components from hard water. The separating means 10 in the first embodiment includes the end portion 4a of the hard water supply piping 4 and a plurality of adsorption plates 11.

The end portion 4a of the hard water supply piping 4 is connected to an outer periphery of the treatment vessel 8 and is disposed so as to release water in a direction offset from a central axis of the treatment vessel 8. Such an offset disposition enables a swirling flow to be formed in a liquid released into the treatment vessel 8. By virtue of the formation of the swirling flow, the metal components with a high specific gravity can be moved outside from the central axis in the treatment vessel 8, for centrifugal separation.

The adsorption plate 11 is a plate having a function of adsorbing the crystallized and precipitated metal components.

The soft water drawing piping 12 is a member for drawing soft water whose hardness has been lowered to a predetermined value or less by the treatment in the treatment vessel 8. The soft water drawing piping 12 may be connected to the regenerated salt water tank 5a of FIG. 1 for example. The soft water drawing piping 12 is an example of soft water drawing means that draws soft water. WHO's definitions for example may be used as definitions of hard water and soft water. That is, soft water may be defined as having a hardness less than 120 mg/L, whereas hard water may be defined as having a hardness of 120 mg/L or more.

As shown in FIG. 4, the soft water drawing piping 12 is disposed such that its upstream end portion lies at a position substantially overlapping with the central axis of the treatment vessel 8 so as to pump up water in the treatment vessel 8. Such a disposition enables the soft water drawing piping 12 to draw treatment water (e.g. soft water) not containing metal components centrifugally separated by the swirling flow.

The separated water discharge piping 14 is a member for discharging separated water in which metal components crystallized from metal ions are concentrated. The separated water discharge piping 14 is an example of separated water discharging means that discharges separated water. The separated water discharge piping 14 is connected to the outer periphery of the treatment vessel 8 at an upper end portion of the treatment vessel 8. Such a disposition enables the separated water discharge piping 14 to draw separated water containing metal components centrifugally separated by the swirling flow.

<Water Softening Treatment>

In such a configuration, the fine bubble generating means 6 generates fine bubbles from "air" to supply the air fine bubbles into hard water, thereby performing the water softening treatment.

It is presumed that supply of air fine bubbles to the hard water supply piping 4 brings about actions as described in sections (1) and (2) below for metal ions in hard water. Specifically, it is presumed that metal ions can be removed from hard water by allowing fine bubbles to adsorb metal ions in hard water and by crystallizing the adsorbed metal ions. Specifically, it is as follows. Note that there are no restrictions by specific principles described in the sections (1) and (2) below.

(1) Metal Ion Adsorption

Figure 5:
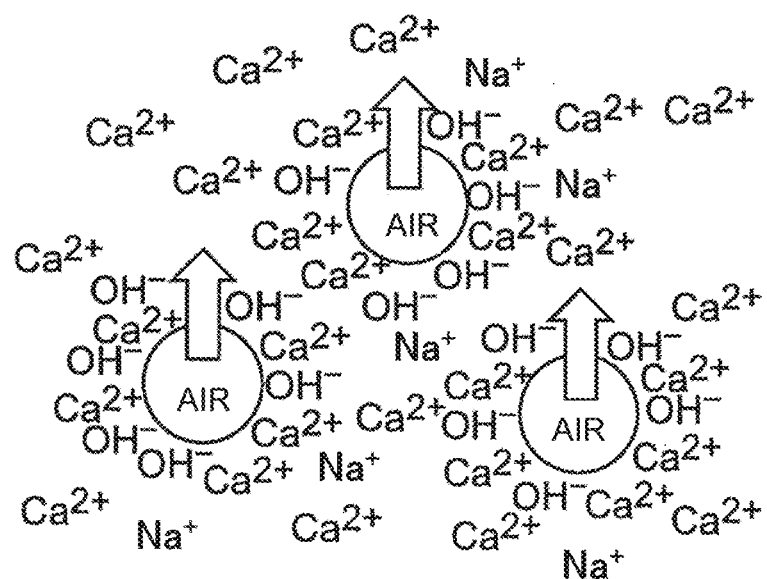
FIG. 5 is a diagrammatic view for explaining a hypothetical principle of metal ion adsorption by the ion removal device of the first embodiment.

As shown in FIG. 5, when air fine bubbles are supplied into hard water, $H^+$ (hydrogen ions) and $OH^-$ (hydroxide ions) are mixedly present on surfaces of fine bubbles, with $H^+$ being charged to a positive charge and with $OH^-$ being charged to a negative charge (only $OH^-$ is shown in FIG. 5). On the other hand, in hard water, $Ca^{2+}$ and $Mg^{2+}$ are present as metal ions charged to positive charges. In subsequent explanations, $Ca^{2+}$ will be described as an example of the metal ion. In the case of drained water from the ion-exchange resin regeneration treatment, sodium ions ($Na^+$) may be contained.

$Ca^{2+}$ with a positive charge is adsorbed by $OH^-$ present on surfaces of fine bubbles by intermolecular force actions (interionic interactions). It is thus possible to allow fine bubbles to adsorb $Ca^{2+}$. Although $H^+$ repelling $Ca^{2+}$ is present on surfaces of fine bubbles, it is conceivable that $OH^-$ act preferentially over $H^+$ to adsorb $Ca^{2+}$. In the case of drained water from the ion-exchange resin regeneration treatment, coalescence of micro bubbles is suppressed by sodium ions in drained water, enabling surface areas of fine bubbles to be kept small.

(2) Metal Component Crystallization

Figure 6:
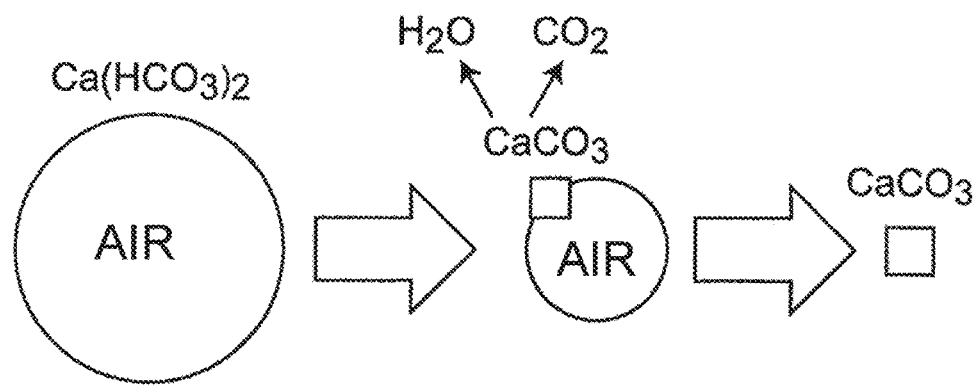
FIG. 6 is a diagrammatic view for explaining a hypothetical principle of metal component crystallization by the ion removal device of the first embodiment.

In addition to the reactions shown in FIG. 5, air fine bubbles are supplied to hard water so that reactions shown in FIG. 6 are accelerated. Specifically, air fine bubbles supplied into hard water are hard to rise upward unlike ordinary bubbles and dissolve in hard water, with the result that surface tensions increase to allow gradual shrinkage as shown in FIG. 6. As described earlier, $ca^{2+}$ is adsorbed on surfaces of fine bubbles. More specifically, it exists as a calcium ion of soluble $Ca(HCO_3)_2$ (calcium hydrogencarbonate). Here, when fine bubbles gradually shrink, $Ca^{2+}$ dissolved concentration on surfaces of fine bubbles rises. Due to the rise of the dissolved concentration, a supersaturation state appears at a certain point of time, allowing crystallization and precipitation of $Ca^{2+}$. When represented by a specific chemical formula, it is as Formula 1 below.

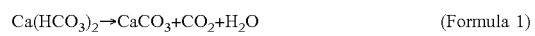

$$Ca(HCO_3)_2 \rightarrow CaCO_3 + CO_2 + H_2O \quad \text{(Formula 1)}$$

Since $CaCO_3$ (calcium carbonate) is insoluble (water-insoluble), it precipitates as crystals. Thus, one dissolved as $Ca^{2+}$ of $Ca(HCO_3)_2$ is precipitated as crystals. By accelerating such reactions, the metal ion $Ca^{2+}$ can be removed from hard water.

Although reactions opposite to Formula 1 can occur in the same water, it is presumed that continuous supply of fine bubbles enables the reactions in the direction of Formula 1 to be preferentially carried out in that equilibrium relationship.

Afterward, water with fine bubbles added thereto is discharged from the end portion 4a of the hard water supply piping 4 in the direction offset from the central axis of the treatment vessel 8, to thereby create a swirling flow in the circumferential direction. Subsequently, treatment water is continuously discharged from the end portion 4a so that treatment water ascends while swirling in the circumferential direction. The above reactions of "(1) Metal Ion Adsorption" and "(2) Metal Component Crystallization" occur in the hard water supply piping 4 and the treatment vessel 8.

As described before, the plurality of adsorption plates 11 are disposed within the interior of the treatment vessel 8. Thus, crystallized and precipitated $CaCO_3$, which has been described in the section (2) Metal Component Crystallization, is adsorbed on the adsorption plates 11 in the middle of centrifugal separation by the swirling flow. As a result, the component derived from $Ca^{2+}$ can be separated and removed.

On the other hand, remaining $CaCO_3$, not adsorbed by the adsorption plates 11, is moved further outside in the treatment vessel 8. Afterward, it is discharged, while being contained in the separated water, to the exterior from the separated water discharge piping 14 disposed at the upper end portion of the treatment vessel 8.

Water softened by separating metal ions and metal components therefrom is drawn from the soft water drawing piping 12. Hard water can thus be softened.

<Regeneration Treatment>

Through execution of the water softening treatment, crystallized and precipitated $CaCO_3$ adheres to the adsorption plates 11 and an inner wall of the treatment vessels 8. The regeneration treatment is performed as a treatment for restoring this $CaCO_3$ to $Ca(HCO_3)_2$. Specifically, the fine bubble generating means 6 generates fine bubbles from a gas different from one at the time of the water softening treatment, to supply to the hard water supply piping 4.

The fine bubble generating means 6 in the first embodiment uses "carbon dioxide" as a regeneration treatment gas.

Figure 7:
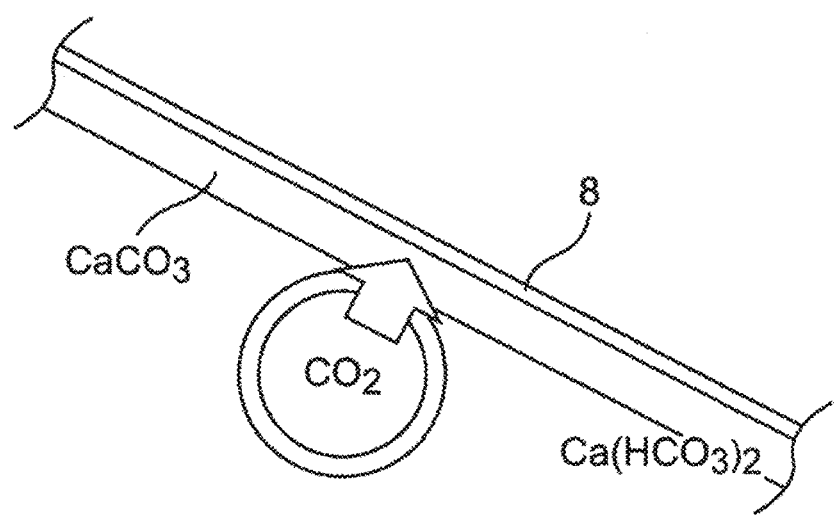
FIG. 7 is a diagrammatic view for explaining a hypothetical principle of the regeneration treatment by the ion removal device of the first embodiment.

As shown in FIG. 7, carbon dioxide fine bubbles are supplied to $CaCO_3$ adhered to the inner wall of the treatment vessel 8 and the adsorption plates 11, to thereby accelerate a reaction below.

(Formula 2)

From the above reaction, soluble (water soluble) $Ca(HCO_3)_2$ is produced from insoluble $CaCO_3$. $Ca(HCO_3)_2$ dissolves in water and is discharged from the separated water discharge piping 14 as described before. This enables insoluble $CaCO_3$ existing within the treatment vessel 8 to be discharged to the exterior, for returning to the original state. Afterward, the earlier-described water softening treatment can again be carried out.

Although in the above description $Ca^{2+}$ has been exemplified as the metal ion, it is presumed that a similar reaction occurs for $Mg^{2+}$.

As described above, the ion removal device 2 of the first embodiment is one that performs the water softening treatment and the regeneration treatment using fine bubbles. Particularly, in the water softening treatment, by supplying air fine bubbles into hard water, metal ions are adsorbed on the fine bubbles so that the adsorbed metal ions can be crystallized and precipitated as metal components. By separating these metal ions and metal components from hard water, soft water can be produced.

According to such a method, due to the treatment utilizing gases such as air and carbon dioxide for execution, different from the case of using ion-exchange resin, there is no need for a large volume of salt water, etc. for re-adsorbing sodium ions in contrast to the case of the ion-exchange resin that needs for a large volume of salt water, etc. This makes the regeneration treatment easy and facilitates maintenance.

Since there is no occurrence of regeneration drained water containing salt water in contrast to the case of the ion-exchange resin that occurs regeneration drained water containing salt water, problems such as soil pollution and increased sewage disposal are eliminated, which is environmentally friendly.

Furthermore, since there is no increased sodium ion concentration in the treatment water in contrast to the case of the ion-exchange resin with increased sodium ion concentration, it is recommended as drinking water.

It is thus possible to provide the ion removal device 2 having excellent maintainability and environmental friendliness.

As described above, the ion removal device 2 of the first embodiment includes the fine bubble generating means 6 generating fine bubbles and supplies the fine bubbles generated by the fine bubble generating means 6 into hard water, thereby allowing metal ions in hard water to be adsorbed on the fine bubbles, to remove metal ions from hard water. That is, an ion removal method of the first embodiment includes a step of generating fine bubbles and a step of supplying the generated fine bubbles into hard water, and allows metal ions in hard water to be adsorbed on the fine bubbles, to remove metal ions from hard water.

According to such a configuration and method, as compared with case of using the ion-exchange resin, it is possible to provide the ion removal device 2 having excellent maintainability and environmental friendliness.

Furthermore, the ion removal device 2 of the first embodiment crystallizes (with shrinkage of fine bubbles) metal ions adsorbed on the fine bubbles. That is, the ion removal method of the first embodiment further includes a step of crystallizing (with shrinkage of fine bubbles) metal ions adsorbed on the fine bubbles.

According to such a configuration and method, metal ion removal can be promoted by performing crystallization of metal ions in addition to adsorption of metal ions.

Furthermore, the ion removal device 2 of the first embodiment further includes the separating means 10 that separates crystallized crystals. That is, the ion removal method of the first embodiment further includes a step of separating crystallized crystals.

According to such a configuration and method, soft water production can be promoted.

Furthermore, according to the ion removal device 2 of the first embodiment, the fine bubble generating means 6 takes in air to generate fine bubbles therefrom in the water softening treatment. Similarly, the ion removal method of the first embodiment takes in air to generate fine bubbles therefrom in the step of generating fine bubbles.

According to such a configuration and method, due to use of air, the cost of generating fine bubbles can be kept extremely low.

Furthermore, the ion removal device 2 of the first embodiment performs a regeneration treatment by supplying carbon dioxide fine bubbles after removal of metal ions from hard water. Similarly, the ion removal method of the first embodiment further includes a step of performing a regeneration treatment by supplying carbon dioxide fine bubbles after removal of metal ions from hard water.

According to such a configuration and method, the reaction of generating soluble $Ca(HCO_3)_2$ from insoluble $CaCO_3$ can be promoted and the regeneration treatment can be promoted.

Example 1

Example 1 of the first embodiment will next be described.

The Example 1 is one in which the inventors carried out experiments on contents described in the section <Water Softening Treatment> of the first embodiment. Specifically, the experiments were carried out using a device 20 shown in FIGS. 8A and 8B. In consequence, a result shown in FIG. 9 was obtained.

Figure 8A:
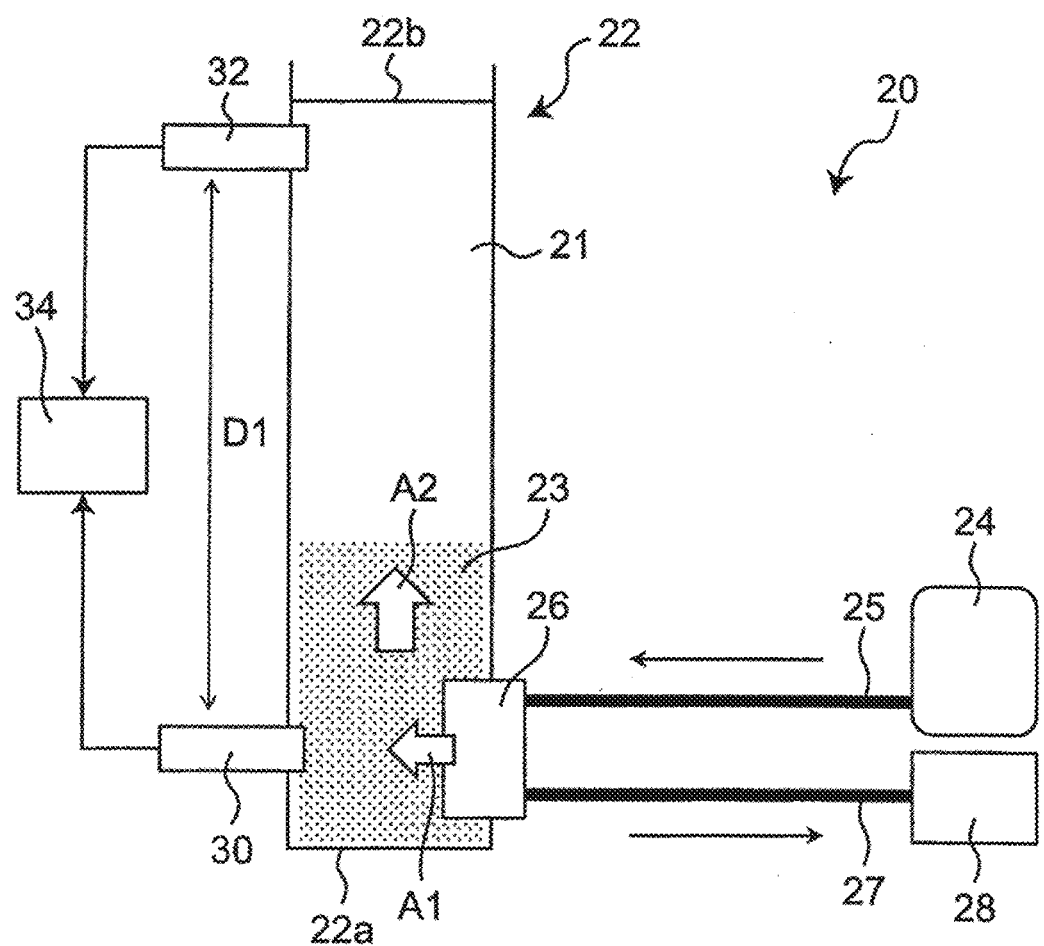
FIG. 8A is a view showing a state after the lapse of predetermined time from occurrence of fine bubble generation in Example 1 of the first embodiment.
Figure 8B:
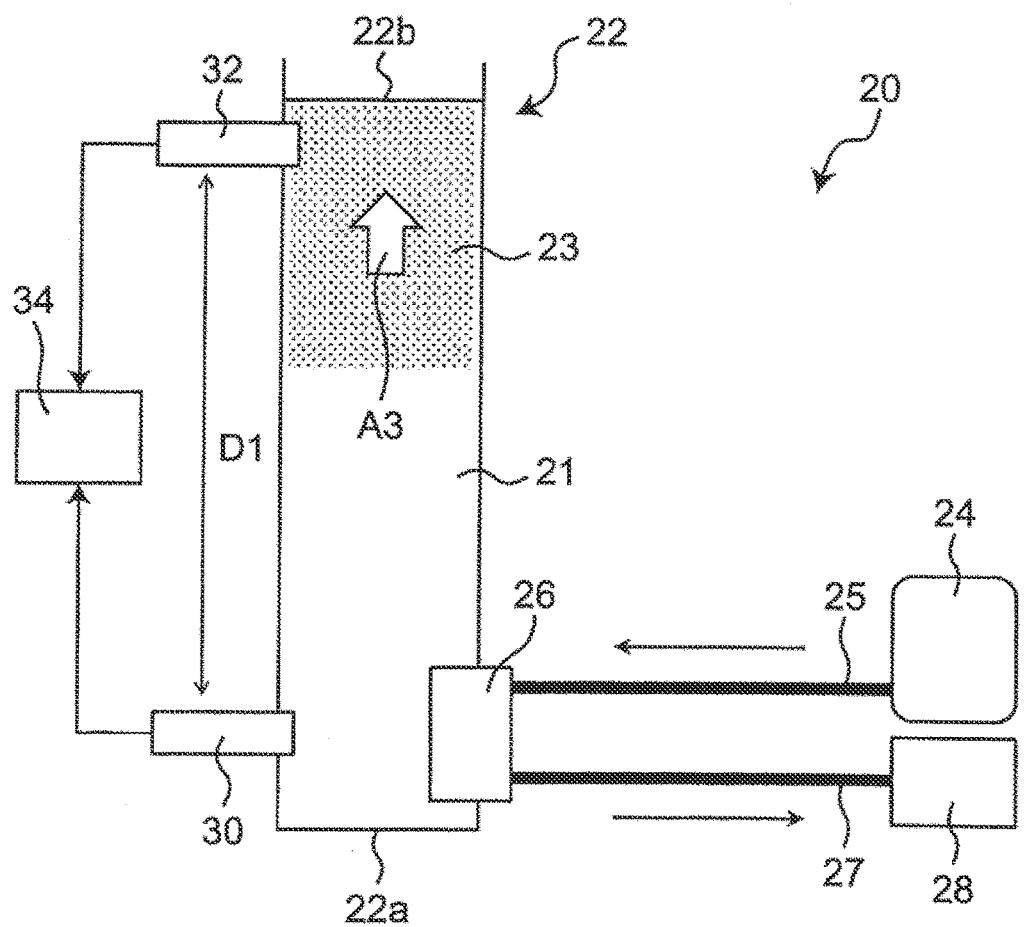
FIG. 8B is a view showing a state after the lapse of an additional predetermined time from the state shown in FIG. 8A in Example 1 of the first embodiment.

FIGS. 8A and 8B are views showing a schematic configuration of the device 20 used in this Example 1. FIG. 8A shows a state after the lapse of predetermined time (specifically, after the lapse of 15 sec) from generation of fine bubbles, while FIG. 8B shows a state after the lapse of an additional predetermined time (specifically, after the lapse of 45 sec) from the state shown in FIG. 8A. The state of FIG. 8A corresponds to a state at elapsed time of 15 sec from the fine bubble generation in FIG. 9, while the state of FIG. 8B corresponds to a state at elapsed time of 60 sec from the fine bubble generation in FIG. 9.

The device 20 shown in FIGS. 8A and 8B is an experimental device capable of supplying fine bubbles 23 from a bottom surface side in a water vessel 22 containing hard water 21. The device 20 can measure a metal ion concentration in hard water 21 at two points, the bottom surface side and a water surface side. As a result of supplying the fine bubbles 23 into the water vessel 22 using such a device 20 to detect a metal ion concentration transition at the bottom surface side and the water surface side, the result shown in FIG. 9 was obtained.

Figure 9:
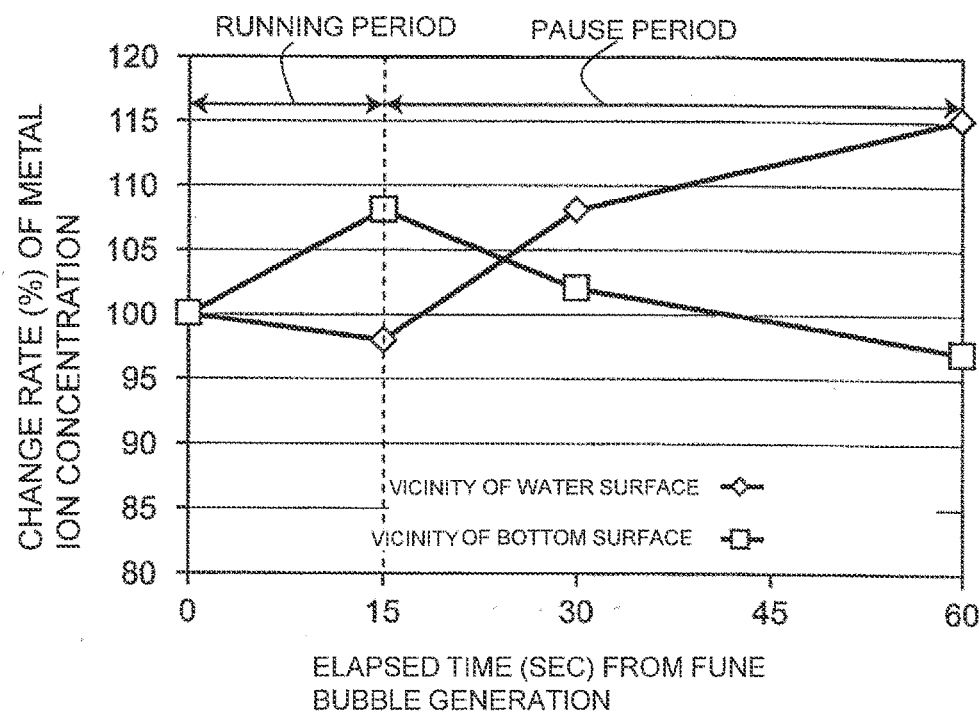
FIG. 9 is a view showing a result of Example 1 of the first embodiment.

The result shown in FIG. 9 verified effects of "metal ion adsorption by fine bubbles" described in the section <Water Softening Treatment> of the first embodiment. A specific result will be described later.

As shown in FIGS. 8A and 8B, the device 20 includes the water vessel 22, a gas supply part 24, a first piping 25, a fine bubble generation part 26, a second piping 27, a pump 28, a first water intake part 30, a second water intake part 32, and a metal ion concentration detector 34.

The water vessel 22 is a water vessel that contains hard water 21. In the example shown in FIGS. 8A and 8B, the water vessel is configured as a vertically elongated vessel. The gas supply part 24 is a member that supplies gas via the first piping 25 to the fine bubble generation part 26. The fine bubble generation part 26 is a device that generates fine bubbles 23 from gas supplied from the gas supply part 24. The fine bubble generation part 26 corresponds to the fine bubble generating means 6 of the first embodiment described before. Supply of gas from the gas supply part 24 to the fine bubble generation part 26 is performed by a negative pressure action by the pump 28 via the second piping 27.

The first water intake part 30 is a member that takes in sample water of hard water 21 from the vicinity of a bottom surface 22a of the water vessel 22. The second water intake part 32 is a member that takes in sample water from the vicinity of a water surface 22b of the water vessel 22. Height positions of the first water intake part 30 and the second water intake part 32 may be set to any positions and a distance D1 from the first water intake part 30 to the second water intake part 32 can be adjusted to a desired value.

In the example shown in FIGS. 8A and 8B, the height position of the first water intake part 30 is set to substantially the same position as a height position at which the fine bubble generation part 26 generates fine bubbles 23.

The metal ion concentration detector 34 is a member that detects a metal ion concentration in sample water taken in from the first water intake part 30 and the second water intake part 32.

When running the fine bubble generation part 26 and the pump 28 in the above configuration, gas is delivered from the gas supply part 24 via the first piping 25 to the fine bubble generation part 26 by the negative pressure action by the pump 28 via the second piping 27. From this gas as a raw material, the fine bubble generation part 26 generates fine bubbles 23, to supply to the water vessel 22 (an arrow A1 of FIG. 8A).

The fine bubble generation part 26 and the pump 28 are run for a predetermined period of time (15 sec in this Example 1), to allow continuous generation of fine bubbles 23.

Afterward, running of the fine bubble generation part 26 and the pump 28 is stopped. After the stop of running, a predetermined pause period is provided (45 sec in this Example 1).

As shown in FIG. 8A, it was visually confirmed that at the end of the running period (after 15 sec from the fine bubble generation), fine bubbles 23 supplied into the water vessel 22 ascended within hard water 21 (an arrow A2) and stayed in a lower portion of the water vessel 22.

As shown in FIG. 8B, it was visually confirmed that at the end of the pause period (after 60 sec from the fine bubble generation), fine bubbles 23 supplied into hard water 21 further ascended to arrive at the water surface 22b (an arrow A3) and stayed in an upper portion of the water vessel 22.

Sample water was taken in from the first water intake part 30 and the second water intake part 32 at a predetermined timing during the above running and the metal ion concentration was measured by the metal ion concentration detector 34, the result of which is shown in FIG. 9.

Specific experimental conditions on the result of FIG. 9 are as follows.

(Experimental Conditions)

Type of gas supplied by gas supply part 24: air

Hardness of hard water 21: approx. 300 mg/L

Temperature of hard water 21: 25° C.

Distance D1 from first water intake part 30 to second water intake part 32: approx. 1 m Running period of fine bubble generation part 26 and pump 28: 15 sec Pause period of fine bubble generation part 26 and pump 28: 45 sec Metal ion concentration detector 34: product of Horiba. Ltd, LAQUAN F-70

Metal ion to be measured: $Ca^{2+}$

Sample water intake timing: 0 sec, 15 sec, 30 sec, and 60 sec after start of running In FIG. 9, a horizontal axis represents the elapsed time (sec) from fine bubble generation, while a vertical axis represents a change rate (%) of metal ion ($Ca^{2+}$) concentration detected by the metal ion concentration detector 34. The metal ion concentration change rate represents a metal ion concentration transition when the metal ion concentration measured at the start of running is 100%.

As shown in FIG. 9, the concentration of sample water extracted from the first water intake part 30 in the vicinity of the bottom surface 22a of the water vessel 22 rises up to approx. 108% at the lapse of 15 sec. During the subsequent pause period, it gradually lowers and finally gradually decreases down to approx. 97%.

On the other hand, the concentration of sample water extracted from the second water intake part 32 in the vicinity of the water surface 22b of the water vessel 22 keeps about 100% till the lapse of 15 sec, and thereafter, during the subsequent pause period, it gradually rises and finally gradually increases up to approx. 115%.

Correlating the above result of the metal ion concentration transition with the behavior of fine bubbles 23, the following can be said.

At the lapse of 15 sec shown in FIG. 8A, the metal ion concentration rises in sample water at the first water intake part 30 around which fine bubbles 23 stay. On the contrary, the metal ion concentration hardly changes in sample water at the second water intake part 32 around which fine bubbles 23 do not stay.

At the lapse of 60 sec shown in FIG. 8B, the metal ion concentration decreases to less than 100% in sample water at the first water intake part 30 around which fine bubbles 23 do not stay. On the contrary, the metal ion concentration rises to a large extent in sample water at the second water intake part 32 around which fine bubbles 23 stay.

According to such a result, it is presumed that $Ca^{2+}$ as metal ions in hard water 21 is adsorbed by fine bubbles 23 and ascends together with the ascent of fine bubbles 23.

Based on the above presumption, the effect was verified of "adsorption of metal ions by fine bubbles" described in the section <Water Softening Treatment> of the first embodiment.

Second Embodiment

An ion removal device of the second embodiment according to the present invention will be described. In the second embodiment, differences from the first embodiment will mainly be described. In the second embodiment, the same reference numerals are imparted for explanations to the same or equivalent configurations as/to the first embodiment. In the second embodiment, descriptions overlapping with the first embodiment will be left out.

The second embodiment differs from the first embodiment in that nitrogen instead of air is used as a gas of fine bubbles in the water softening treatment.

It is presumed that by generating nitrogen fine bubbles from the fine bubble generating means 6 to supply into hard water, there are promoted actions as described in sections (3) and (4) below in addition to the actions of "(1) Metal Ion Adsorption" and "(2) Metal Component Crystallization" described above. It is to be noted that specific principles described in the following sections (3) and (4) provide no restrictions.

(3) Acceleration of Metal Ion Adsorption

As shown in FIG. 10(a), the periphery of a fine bubble is charged with $H^+$ and $OH^-$. As described earlier, $Ca^{2+}$ charged to a positive charge is adsorbed by $OH^-$ charged to a negative charge. In the case of using nitrogen as fine bubbles under such a situation, reactions of Formula 3 below are accelerated.

$$N_2 + 6H^+ + 6e^- \rightarrow 2NH_3$$

$$NH_3 + H_2O \rightarrow NH_4^+ + OH^- \quad \text{(Formula 3)}$$

With the accelerated reactions of Formula 3, as shown in FIG. 10(b), the number of $H^+$ ions becomes smaller than the number of $OH^-$ ions. This allows the fine bubble to have a strengthened negative charge and more easily adsorb $Ca^{2+}$ with a positive charge.

In the case of using nitrogen as in the second embodiment, as compared with the case of using air as in the first embodiment, the ion adsorption reaction of the above Formula 3 can be accelerated and therefore the metal ion adsorption is more accelerated. Hence, a larger number of metal ions can be separated and removed from hard water.

It is presumed that, without being limited to nitrogen, the above principle similarly applies to any gases capable of reacting with $H^+$ ions and reducing the number of $H^+$ ions than the number of $OH^-$ ions.

(4) Acceleration of Metal Component Crystallization

Since nitrogen is an inert gas different from air, when supplied into hard water, it brings about a state where the partial pressure of gas contained in hard water goes unbalanced. As a result, reactions shown in FIG. 11 are accelerated.

Figure 11:
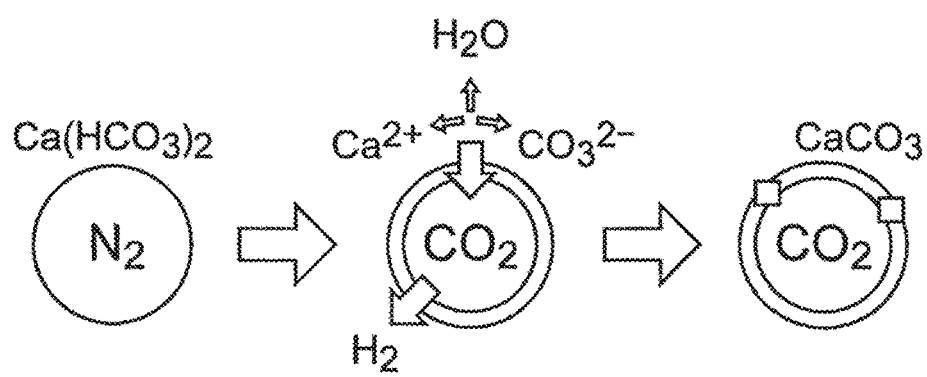
FIG. 11 is a diagrammatic view for explaining a hypothetical principle of metal component crystallization by the ion removal device of the second embodiment.

As shown in FIG. 11, another gas component dissolved in hard water acts to replace a fine bubble composed of nitrogen. In the example shown in FIG. 11, $CO_2$ is contained in $Ca(HCO_3)_2$ existing around the fine bubble, and this $CO_2$ is extracted to act to replace nitrogen. That is, a following reaction is accelerated.

$$Ca(HCO_3)_2 \rightarrow CaCO_3 + CO_2 + H_2O \quad \text{(Formula 4)}$$

In this manner, the reaction occurs where insoluble $CaCO_3$ is produced from soluble $Ca(HCO_3)_2$. At this time, $CO_2$ and $H_2O$ appear. Since $CaCO_3$ is insoluble, it is precipitated as crystals.

By the above reaction, the metal component contained as $Ca^{2+}$ of $Ca(HCO_3)_2$ in hard water can be crystallized and precipitated. The metal ions are thus removed from hard water.

It is presumed that, without being limited to nitrogen, the above principle similarly applies to any gases other than air making the partial pressure of gas dissolving in hard water unbalanced.

As described above, in the second embodiment, nitrogen is taken in to generate fine bubbles to be supplied into hard water, whereby as compared with the case of using air, the reactions can be accelerated that have been described in the sections "(3) Acceleration of Metal Ion Adsorption" and "(4) Acceleration of Metal Component Crystallization". Hereby, the accuracy of removing metal ions from hard water can be improved.

Third Embodiment

Description will be given of a metal ion removal method by an ion removal device of the third embodiment according to the present invention. In the third embodiment, differences from the first and second embodiments will chiefly be described, and descriptions overlapping with the first and second embodiments will be omitted.

Although in the first and second embodiments, the fine bubble generating means 6 generates fine bubbles from one gas selected from a plurality of types, the third embodiment differs from the first and second embodiments in that fine bubbles are generated from a mixture gas in which plural types of gases are mixed.

In the third embodiment, in particular, a mixture of two types of gases, a first gas that is a basic gas and a second gas that is a gas having property of slower dissolution speed than the first gas is used as the mixture gas for generating fine bubbles. That is, in place of the fine bubble generating means 6 shown in FIG. 4, fine bubble generating means (not shown) generating fine bubbles from the mixture gas of the first gas and the second gas is used.

It is presumed that by generating fine bubbles from the mixture gas containing the first gas and the second gas, there are promoted actions as described in sections (5) and (6) below in addition to the actions of "(1) Metal Ion Adsorption" and "(2) Metal Component Crystallization" described above. It is to be noted that specific principles described in the following sections (5) and (6) provide no restrictions.

(5) Potential Change on Fine Bubble Surface by First Gas

The first gas contained in the mixture gas is a basic gas receiving $H^+$ through an acid-base reaction. The first gas dissolves in water to generate $OH^-$. Specifically, a reaction of Formula 5 below occurs.

$$X + H_2O \rightarrow XH^+ + OH^- \quad \text{(Formula 5)}$$

Figure 12:
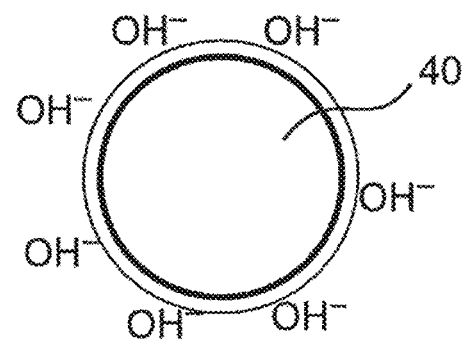
FIG. 12 is a diagrammatic view for explaining a hypothetical principle of metal ion adsorption by an ion removal device of a third embodiment.

In Formula 5, the first gas is represented by a chemical formula X. Occurrence of the reaction of Formula 5 allows the ratio of $OH^-$ existing around a fine bubble 40 to increase as compared with the ratio of $H^+$, as shown in FIG. 12 ($H^+$ is not shown in FIG. 12). As a result, the fine bubble 40 comes to have a stronger negative charge, easily adsorbing $Ca^{2+}$ with a positive charge. Thus, the metal ion adsorption effect by the fine bubble 40 can be improved.

Furthermore, in the third embodiment, in particular, a basic gas, ammonia is used as the first gas. In the case of using ammonia, the above-described Formula 5 is embodied in Formula 6 below.

$$NH_3 + H_2O \rightarrow NH_4^+ OH^- \quad \text{(Formula 6)}$$

By generating fine bubbles 40 using ammonia that is a general-purpose gas having a high water-solubility, the generation cost of the fine bubbles 40 can be reduced while improving the metal ion adsorption effect described above.

It is presumed that the above principle similarly applies to any basic gases without being limited to ammonia. Examples of such a basic gas include methylamine, ethylamine, propylamine, isopropylamine, butylamine, hexylamine, cyclohexylamine, dimethylamine, diethylamine, diisopropylamine, dipropylamine, di-n-butylamine, ethanolamine, diethylethanolamine, dimethylethanolamine, ethylenediamine, dimethylaminopropylamine, N·N-dimethylethylamine, trimethylamine, triethylamine, tetramethylenediamine, diethylenetriamine, propyleneimine, pentamethylenediamine, hexamethylenediamine, morpholine, N-methylmorpholine, and N-ethylmorpholine.

(6) Keeping Fine Bubbles by Second Gas

As described in the above section "(5) Potential Change on Fine Bubble Surface by First Gas", the first gas as the basic gas contained in the mixture gas dissolves in water to increase the ratio of OH⁻ on surfaces of the fine bubbles 40. With such a first gas there is mixed the second gas that is a gas having property of slower dissolution speed than the first gas. By mixing such a second gas, the fine bubbles 40 are prevented from dissolving as a whole in water irrespective of the state where the first gas dissolves in water, with the result that the state of the fine bubbles 40 can be kept. By keeping the state of the fine bubbles 40, the $Ca^{2+}$ ion adsorption effect derived from fine bubbles described in the above-described first and second embodiments can be kept.

In the third embodiment, in particular, nitrogen is used as the second gas. By generating the fine bubbles 40 using nitrogen that is a general-purpose gas harmless to the human body, the generation cost of the fine bubbles 40 can be reduced while ensuring safety. Since nitrogen is a water-insoluble gas, the effect of keeping the state of the fine bubbles 40 can be exerted more effectively.

It is presumed that without being limited to nitrogen, the above principle similarly applies to any gases having a slower dissolution speed than the first gas that is a basic gas. When selecting the second gas, one may be selected that has a slower (lower) water dissolution speed (solubility) than the first gas under conditions where conditions including temperature and pressure are the same. Examples of such a second gas include, in the ascending order of solubility, nitrogen, hydrogen, carbon monoxide, butane, oxygen, methane, propane, ethane, nitrogen monoxide, ethylene, propene, acetylene, and carbon dioxide. Especially thereamong, the case of using a water insoluble gas such as nitrogen monoxide, oxygen, and hydrogen enables the effect of keeping the state of the fine bubbles 40 to be exerted more effectively.

Figure 10:
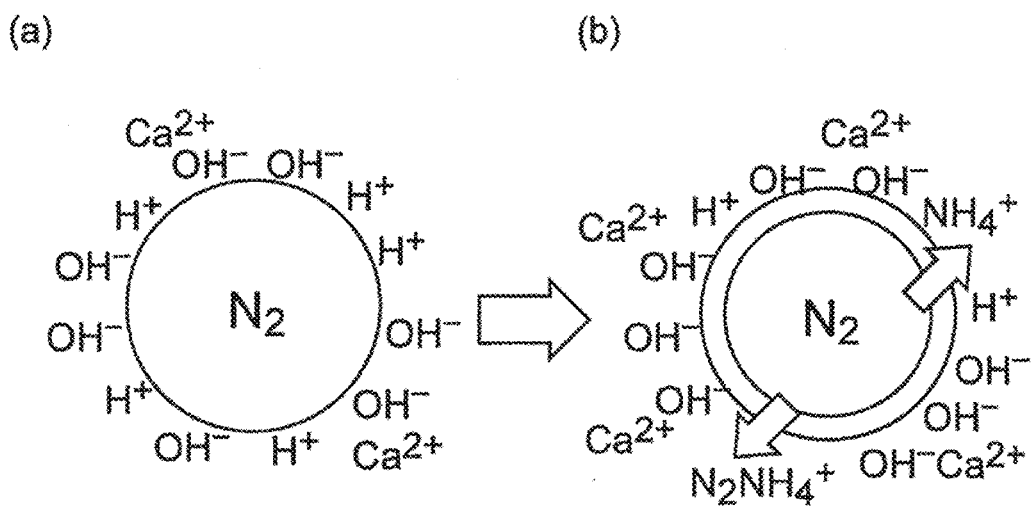
FIG. 10 is a diagrammatic view for explaining a hypothetical principle of metal ion adsorption by an ion removal device of a second embodiment.

Although in the sections "(3) Acceleration of Metal Ion Adsorption" and "(4) Acceleration of Metal Component Crystallization" of the second embodiment, dissolution of nitrogen into hard water has been described using FIGS. 10 and 11, it is conceivable that this reaction also occurs concurrently. Nitrogen is water insoluble and therefore is not easily soluble in water to strongly exert the action of keeping the state of the fine bubbles 40, whereas not a small water-soluble amount is also present. It is thus conceivable that the phenomenon of dissolution of nitrogen in water described in the sections "(3) Acceleration of Metal Ion Adsorption" and "(4) Acceleration of Metal Component Crystallization" also at least sometimes or more often occurs concurrently with the phenomenon of keeping fine bubbles by nitrogen that has been described in the section "(6) Keeping Fine Bubbles by Second Gas".

As described above, the fine bubble generating means of the third embodiment generates fine bubbles 40 originating from a mixture gas in which the first gas as a basic gas and the second gas with property of slower dissolution speed than the first gas are mixed. The first gas as the basic gas dissolves in water to receive H⁺ from water and hence increases the ratio of OH⁻ on the surfaces of the fine bubbles 40. This enables the effect of the fine bubbles 40 adsorbing metal ions such as $Ca^{2+}$ to be increased. Furthermore, by mixing the second gas with property of slower dissolution speed than the first gas, the fine bubbles 40 are prevented from completely dissolving in water so that the state of the fine bubbles 40 can be kept.

In this manner, the first gas as the basic gas is first dissolved in water to allow the second gas with property of slower dissolution speed than the basic gas to be negatively charged, whereupon the above effect can be presented by utilizing the difference in dissolution speed between the two gases.

Although the mixing ratio between ammonia and nitrogen in the fine bubbles 40 may be set to any value, the mixing ratio may be set for example, it may be set for example such that nitrogen has a larger mixing ratio than ammonia (e.g. ammonia:nitrogen is 1:99 in amount of substance (volume ratio)). According to such setting, the region where OH⁻ increases due to dissolution of ammonia is limited to only the vicinity of surfaces of the fine bubbles 40, making it difficult for the ratio of OH⁻ to change at positions apart from the fine bubbles 40. Thus, by allowing only the vicinity of surfaces of the fine bubbles 40 to change, the water quality of water as a whole can be kept unchanged. On the other hand, by increasing the ratio of nitrogen, the state of the fine bubbles 40 can be kept for a longer period of time. In this manner, by setting in the mixture gas the amount of substance of the second gas with a slower dissolution speed than the basic gas, more than the amount of substance of the first gas as the basic gas, the above effect can be presented. Since the amount of substance and the volume are proportional under the same temperature and pressure conditions, the mixing ratio between the first gas and the second gas may be set using either the amount of substance or the volume.

Alternatively, setting may be made such that the mixing ratio of ammonia to nitrogen becomes larger. According to such setting, metal components contained in hard water can be crystallized and removed even more. A principle of accelerating crystallization in this manner will be described in Examples 2 to 4 to be described later.

Dissimilar to the supply form in which ammonia and nitrogen are separately turned into fine bubbles and separately supplied to hard water without being mixed, the fine bubble generating means of the third embodiment supplies to hard water the fine bubbles 40 originating from the mixture gas in which ammonia and nitrogen are mixed. According to such a supply method, ammonia is prevented from solely dissolving at a position apart from the fine bubbles 40, enabling the function of increasing OH⁻ in the vicinity only of surfaces of the fine bubbles 40 to be fully exerted.

Next, using a diagrammatic view of FIG. 13, description will be given of a hypothetical principle of a metal ion adsorption effect of the fine bubbles 40 originating from the mixture gas in which ammonia as the first gas and nitrogen as the second gas are mixed, especially, of a hypothetical principle of a process of finally crystallizing metal ions.

Figure 13:
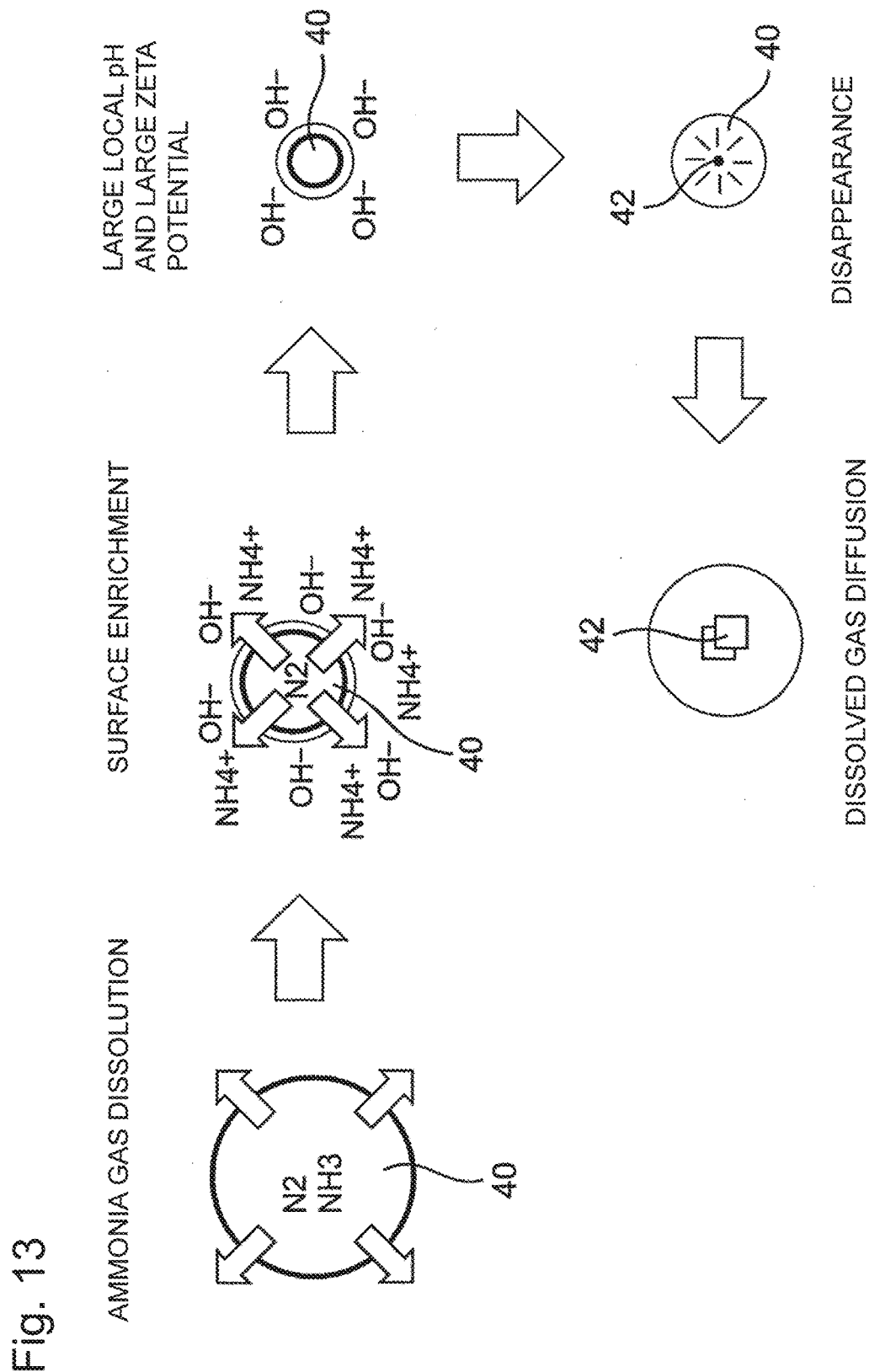
FIG. 13 is a diagrammatic view for explaining a hypothetical principle of metal ion adsorption and crystallization by the ion removal device of the third embodiment.

As shown in FIG. 13, when the fine bubbles 40 are supplied into hard water, water-soluble ammonia among ammonia and nitrogen making up the fine bubbles 40 dissolves in surrounding water (ammonia gas dissolution). Consequently, as described in the above section "(5) Potential Change on Fine Bubble Surface by First Gas", $NH_4^+$ appears on the surface of the fine bubble 40 and the ratio of OH⁻ increases (surface enrichment). At this time, $Ca^{2+}$ ion adsorption effect is enhanced.

When the surface enrichment further advances, the concentration of OH⁻ on the surface of the fine bubble 40 is maximized. That is, pH on the surface of the fine bubble 40 becomes maximum and the zeta potential of the fine bubble 40 becomes maximum (large local pH and large zeta potential).

In the above-described states "ammonia gas dissolution", "surface enrichment", and "large local pH and large zeta potential", $Ca^{2+}$ is in a state adsorbed on the fine bubble 40. If the fine bubbles 40 adsorbing $Ca^{2+}$ are separated from hard water at this time, metal ions can be removed from hard water.

In the case of not performing the above separation or in the case of remaining as the fine bubbles 40 in spite of execution of the separation, crystallization of $Ca^{2+}$ adsorbed on the surfaces of the fine bubbles 40 starts. Specifically, $Ca^{2+}$ is crystallized and precipitates as crystals 42. Furthermore, with the precipitation of the crystals 42, disappearance of the fine bubbles 40 starts (disappearance).

When crystallization of $Ca^{2+}$ and disappearance of the fine bubbles 40 advance, water-insoluble nitrogen keeping the state of the fine bubbles 40 diffuses in water as a dissolved gas (dissolved gas diffusion).

In the above-described states of "disappearance" and "dissolved gas diffusion", substances contained as metal ions in hard water are precipitated as crystals 42. By separating the precipitated crystals 42 from hard water, thus, metal ions in hard water can be crystallized and removed.

Example 2-4

Example 2-4 of the third embodiment will next be described.

The example 2-4 is one in which the inventors carried out experiments on the influences on metal component crystallization of the mixing ratio between ammonia and nitrogen in fine bubbles 40 described above. Specifically, the experiments were carried out using a device 50 shown in FIG. 14.

Figure 14:
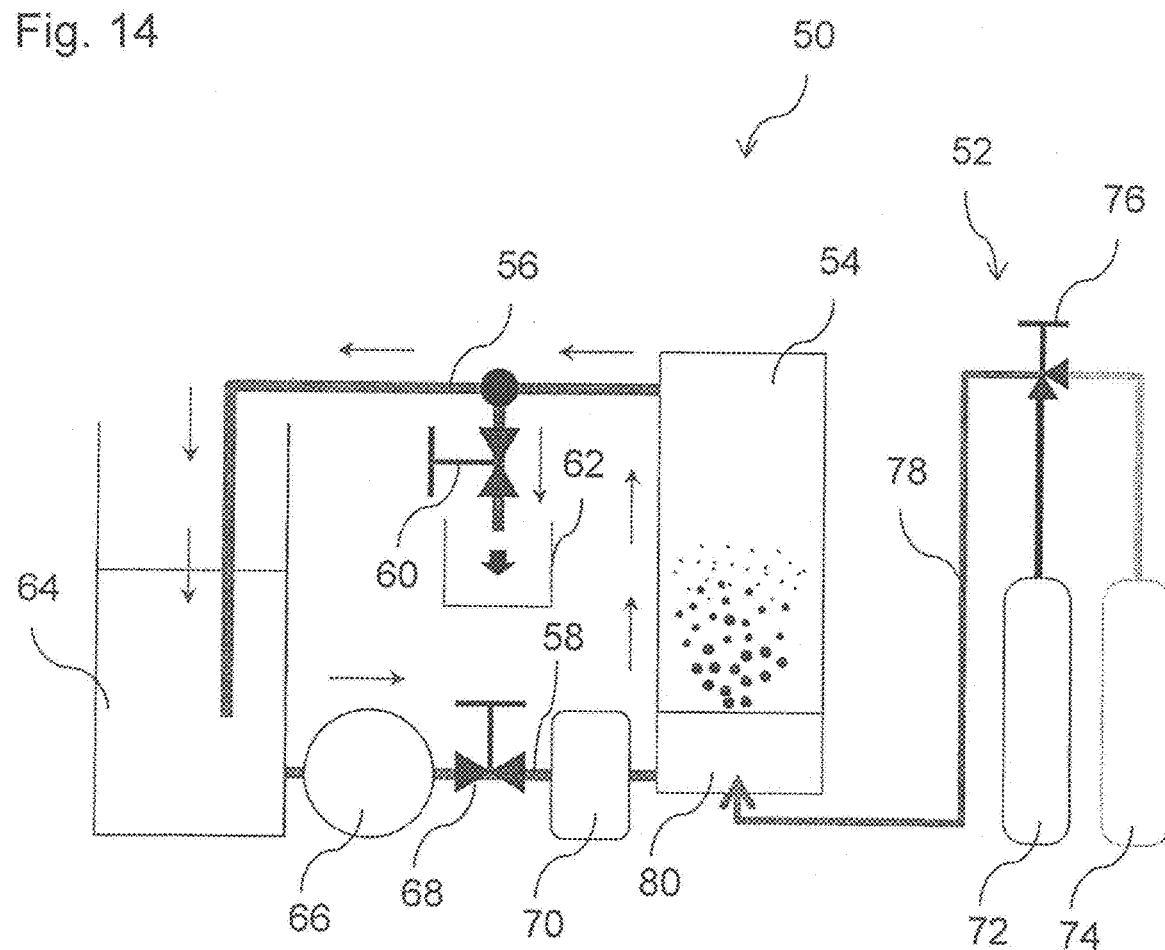
FIG. 14 is a view showing a schematic configuration of a device used in Example 2-4 of the third embodiment.

FIG. 14 is a view showing a schematic configuration of the device 50 used in Example 2-4 of the third embodiment. The device 50 shown in FIG. 14 includes a mixture gas supply part 52, a treatment vessel 54, a first piping 56, a second piping 58, a water sampling valve 60, a water sampler 62, a water storage tank 64, a pump 66, a flow regulating valve 68, and a flowmeter 70.

The mixture gas supply part 52 is a member that supplies a mixture gas to the treatment vessel 54. The mixture gas supply part 52 includes an ammonia supply source 72, a nitrogen supply source 74, a mixing ratio regulating valve 76, a supply piping 78, and a fine bubble supply part 80.

The mixture gas supply part 52 uses the ammonia supply source 72 and the nitrogen supply source 74 to produce a mixture gas in which ammonia (first gas) and nitrogen (second gas) are mixed. The mixing ratio between ammonia and nitrogen is settable to any ratio by the mixing ratio regulating valve 76. The mixture gas is supplied through the supply piping 78 to the fine bubble supply part 80 disposed at the bottom of the treatment vessel 54. The fine bubble supply part 80 is a member that turns the mixture gas into fine bubbles.

The treatment vessel 54 is a vessel that contains hard water in the form of treatment water to be treated. By supplying fine bubbles originating from the mixture gas into hard water in the treatment vessel 54, removal of metal components from hard water, esp. crystallization thereof is performed based on the principle described in the third embodiment. Treatment water after treatment is delivered to the first piping 56. The water sampling valve 60 is disposed midway of the first piping 56. By opening and closing the sampling valve 60, treatment water flowing through the first piping 56 is sampled. Sampled treatment water enters the water sampler 62.

The first piping 56 is connected to the water storage tank 64. The water storage tank 64 is a tank that reservoirs treatment water. Treatment water reservoired in the water storage tank 64 is returned through the second piping 58 to the treatment vessel 54. This allows treatment water to circulate.

The second piping 58 is fitted with the pump 66, the flow regulating valve 68, and the flowmeter 70. The pump 66 is a member that generates a propulsive power causing treatment water within the water storage tank 64 to flow through the second piping 58. The flow regulating valve 68 is a valve that controls the flowrate of treatment water flowing through the second piping 58. The flowmeter 70 is an instrument that measures the flowrate of treatment water flowing into the second piping 58.

Using such a device 50, the treatment of removing metal components in hard water was carried out in the treatment vessel 54 while running the pump 66 continuously, and treatment water after treatment was sampled from the water sampler 62 to measure various parameters. In Example 2-4, investigation was performed esp. of the ratio (crystallization rate) of crystallization of metal components contained in treatment water.

Figure 15:
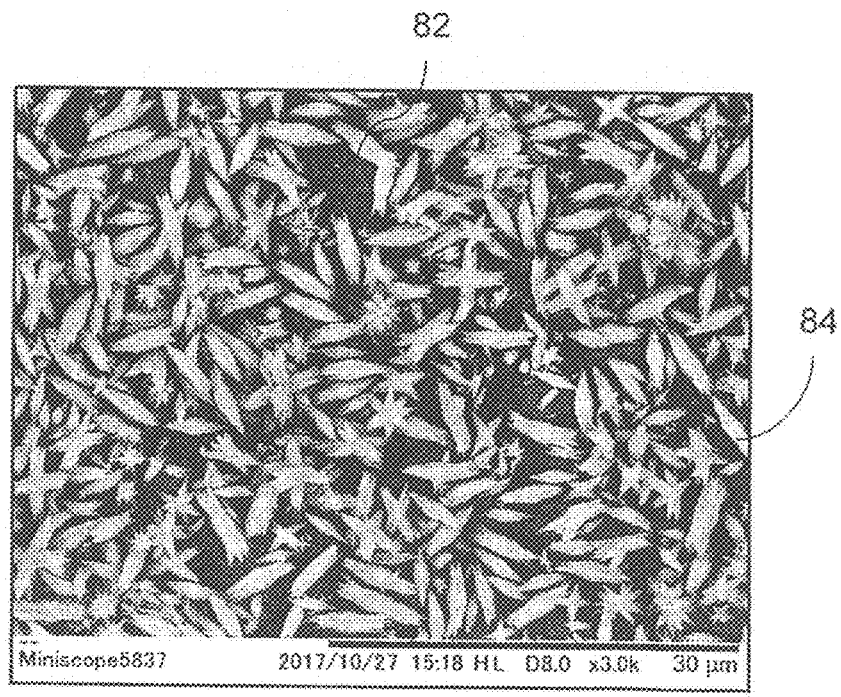
FIG. 15 is a view showing a state where metal components are crystallized in hard water.

FIG. 15 shows an example of the result of observation by a scanning electron microscope (SEM) of treatment water actually treated in Example 2-4. As shown in FIG. 15, many crystals precipitate in treatment water 82.

In Examples 2 and 3, hard water 1 (referred as "hard 1" in Figures) was used as treatment water to be treated. Hard water 1 is Evian (registered trademark), approx. 300 mg/L in hardness. In Example 4, two types, hard water 1 and hard water 2 (referred as "hard 2" in Figures) were used. Hard water 2 is Contrex (registered trademark), approx. 1400 mg/L in hardness.

Example 2

Example 2 used the device 50 described above so that, while allowing hard water to flow into the treatment vessel 54 by running the pump 66, treatment water after the lapse of a predetermined time was sampled as sample water by the water sampler 62. In Example 2, the mixing ratio between ammonia and nitrogen in the mixture gas was changed to investigate differences of crystallization rate among the respective mixing ratios. Specific experimental conditions of Example 2 are shown below. In Example 2, all of treatment water supplied from the treatment vessel 54 to the first piping 56 other than treatment water sampled by the water sampler 62 was disposed of so as not to be supplied to the water storage tank 64.

(Experimental Conditions)

Treatment water type: hard water 1

Ammonia mixing ratio in mixture gas: 0% (nitrogen only), 30%, 40%, 50%, 60%, 70%, 80%, 90%, and 100% (ammonia only)

Treatment water flowrate: 2.6 min

Mixture gas flowrate: 0.03 L/min

Time from activating pump to sampling: 3 min

Sample water measurement items: pH, Ca hardness (mg/L), and total carbonate concentration (mg/L)

Regarding the sample water measurement items, measurement was carried out for sampled sample water from which metal component crystals precipitated therein were removed by filtering sampled sample water. Ca hardness is a value expressing, in terms of calcium carbonate ($CaCO_3$), the content of $Ca^{2+}$ contained in treatment water per unit volume. For measurement of pH, Ca hardness, and total carbonate concentration, commercially available measuring instruments were used respectively.

Figure 16A:
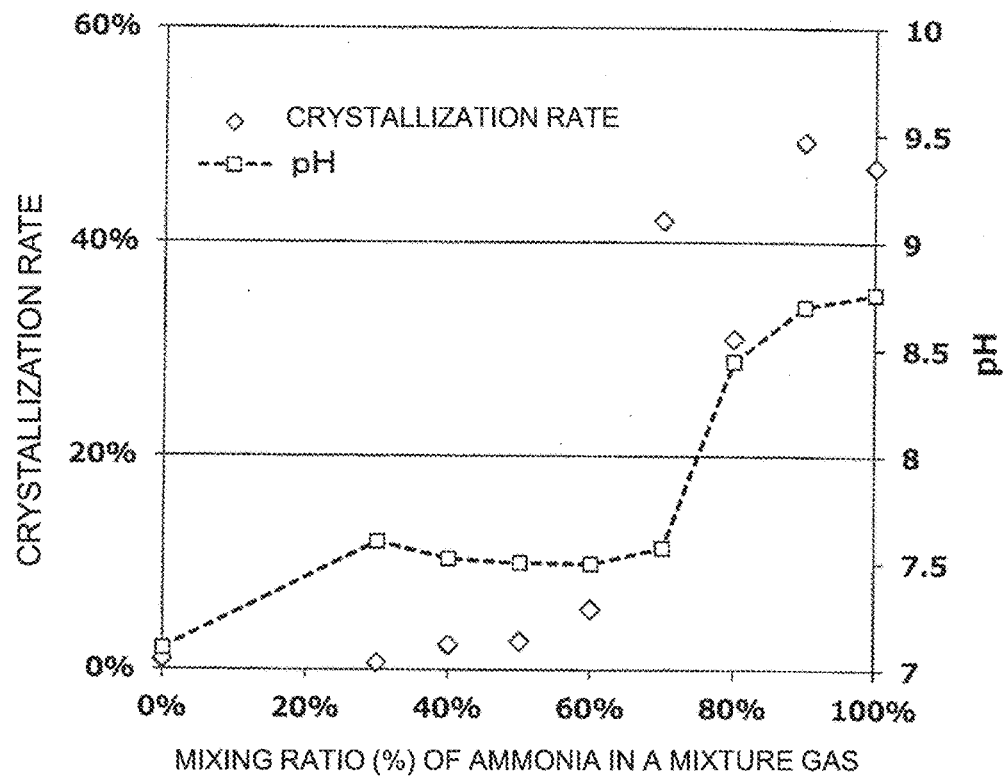
FIG. 16A is a view showing a result of Example 2 of the third embodiment.
Figure 16B:
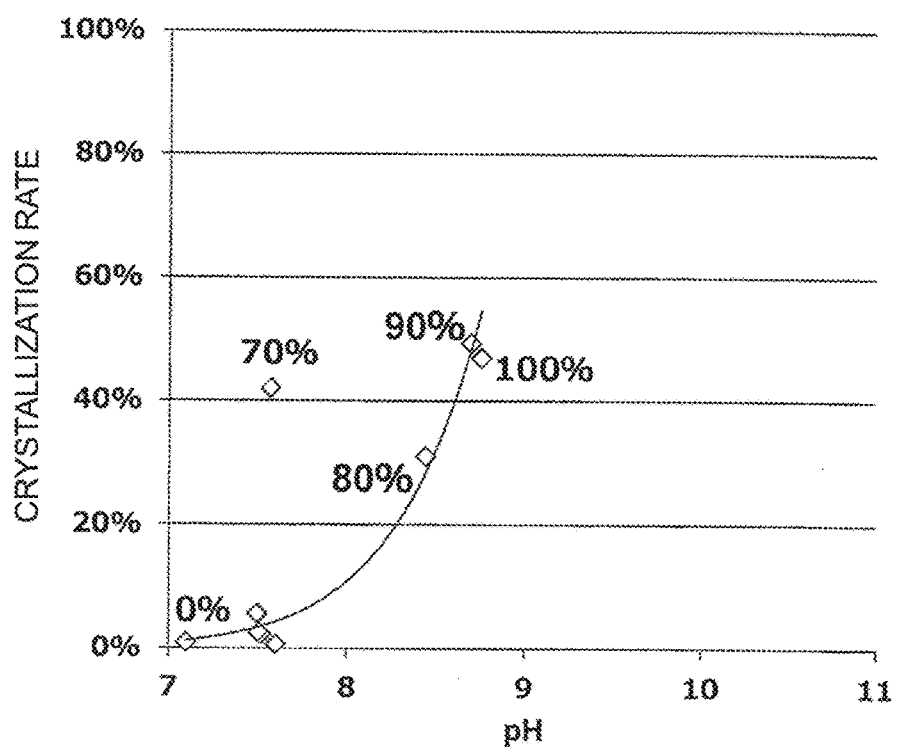
FIG. 16B is a view showing a result of Example 2 of the third embodiment.

Experimental results by Example 2 are shown in FIGS. 16A and 16B.

In FIG. 16A, the horizontal axis represents a mixing ratio (%) of ammonia in a mixture gas, while the vertical axis represents crystallization rate (%) of sample water. In FIG. 16B, the horizontal axis represents pH of sample water, while the vertical axis represents crystallization rate (%) of sample water.

"Crystallization rate" was calculated from (Ca hardness of treatment water before running-Ca hardness of sample water after running)/Ca hardness of treatment water before running. The crystallization rate calculated in this manner represents how much metal component has been crystallized in treatment water per unit volume. A higher crystallization indicates that more metal component has been crystallized from treatment water.

As shown in FIGS. 16A and 16B, as the mixing ratio of ammonia becomes higher, the crystallization rate rises. Particularly, when the mixing rate of ammonia reaches 70% or more, the crystallization rate rises drastically.

As shown in FIGS. 16A and 16B, it can be seen that as the mixing ratio of ammonia becomes higher, pH also rises. Note that although pH rises, it is a value lying between 8.5 and 9 at the maximum. The pH standard for clean water prescribed by Ministry of Health, Labor and Welfare ranges from 5.8 to 9, and it can be seen that it transitions with values close to that range even when the ammonia mixing ratio is high. The desirable drinking range of alkaline ionized water provided for by Pharmaceutical and Medical Device Act is pH 9 to 10. Since the value of pH can be kept lower than this range, it can be seen that it is suitable also as drinking water.

Conceivable as a factor that prevents rise of pH from excessively increasing even in the case of a high ammonia mixing ratio is that local pH around fine bubble 40 is chiefly raised instead of raising pH of the entire treatment water, as described using FIG. 13 described above.

Example 3

Similar to Example 2, Example 3 used the above-described device 50 so that, while allowing hard water to flow into the treatment vessel 54 by running the pump 66, treatment water after the lapse of a predetermined time was sampled as sample water by the water sampler 62. In Example 3, only two patterns, 70% and 100% were used as the ammonia mixing ratio in the mixture gas. Dissimilar to Example 2, sample water was sampled at every predetermined interval from activation of the pump 66, to measure various parameters. Furthermore, dissimilar to Example 2, except treatment water sampled by the water sampler 62, all of treatment water supplied from the treatment vessel 54 to the first piping 56 was returned to the water storage tank 64, to allow treatment water to be circulated. Specific experimental conditions of Example 3 are shown as follows.
(Experimental Conditions)
  Treatment water type: hard water 1
  Ammonia mixing ratio in mixture gas: 70% and 100% (ammonia only)
  Treatment water flowrate: 2.6 L/min
  Mixture gas flowrate: 0.03 L/min
  Sample water measurement items: pH, Ca hardness (mg/L), and total carbonate concentration (mg/L)

Figure 17A:
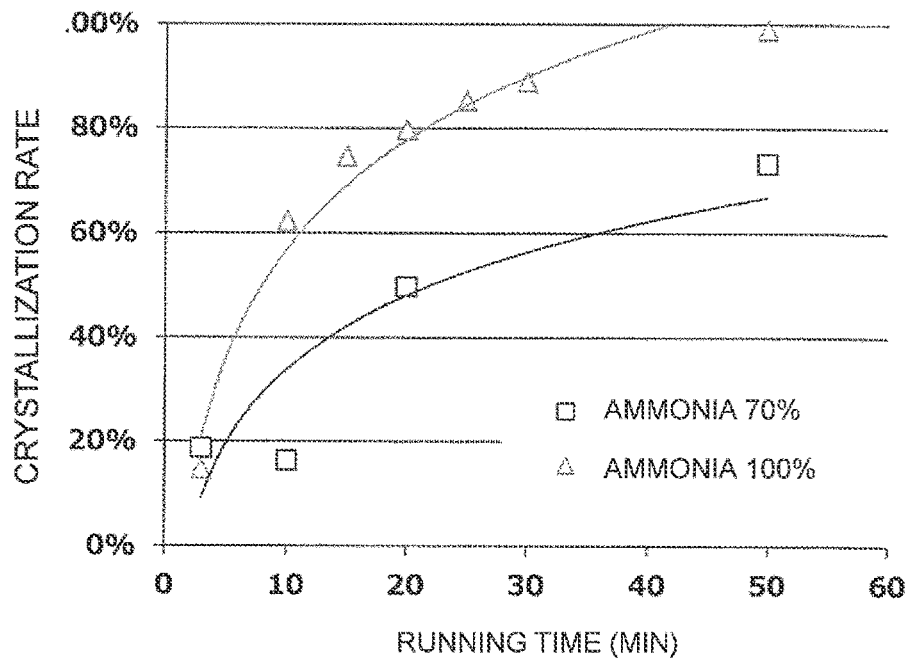
FIG. 17A is a view showing a result of Example 3 of the third embodiment.
Figure 17B:
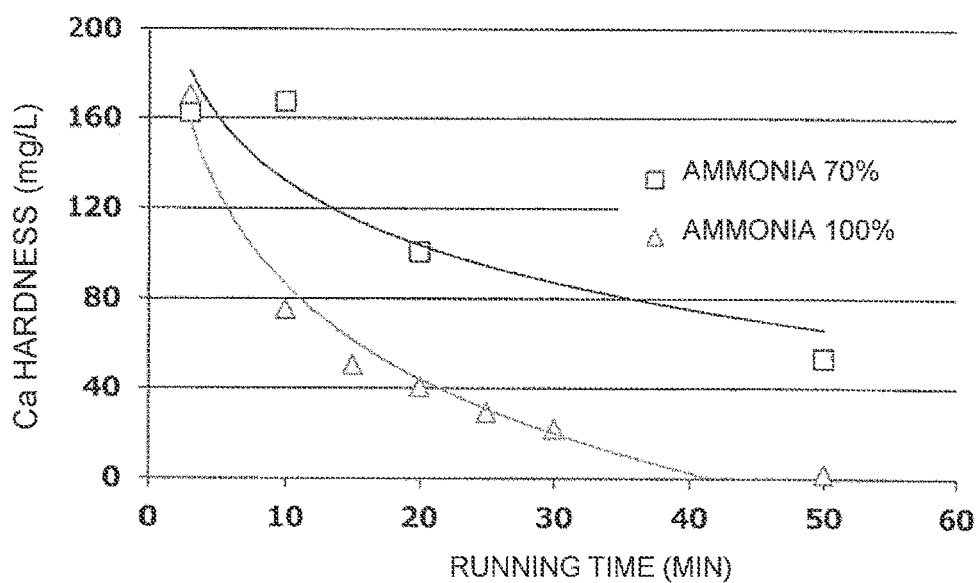
FIG. 17B is a view showing a result of Example 3 of the third embodiment.
Figure 17C:
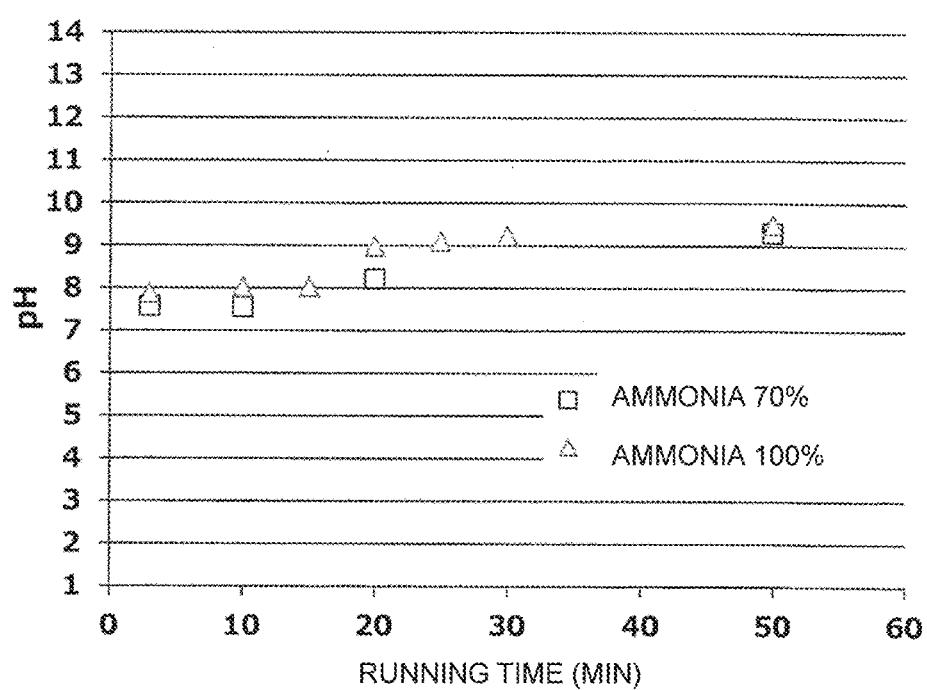
FIG. 17C is a view showing a result of Example 3 of the third embodiment.

Experimental results by Example 3 are shown in FIGS. 17A, 17B, and 17C.

In FIG. 17A, the horizontal axis represents running time (min) of the pump 66, while the vertical axis represents crystallization rate (%) of sample water. In FIG. 17B, the horizontal axis represents running time (min) of the pump 66, while the vertical axis represents Ca hardness (mg/L) of sample water. In FIG. 17C, the horizontal axis represents running time (min) of the pump 66, while the vertical axis represents pH of sample water.

As shown in FIG. 17A, in each case of 70% and 100% in ammonia mixing ratio, the crystallization rate rises with the lapse of running time. As shown in FIG. 17B, the Ca hardness lowers with the lapse of running time. It can thus be seen that by projecting fine bubbles originating from the mixture gas, $Ca^{2+}$ as a metal component dissolving in hard water is crystallized as $CaCO_3$.

On the contrary, in the case of 100% in ammonia mixing ratio as compared with the case of 70%, the rising speed of the crystallization rate and the lowering speed of the Ca hardness become faster. It can thus be seen that ammonia contributes largely to crystallization of $Ca^{2+}$ into $CaCO_3$.

As shown in FIG. 17C, in each case of 70% and 100% in ammonia mixing ratio, pH rises gently with the lapse of running time. Between the case of 70% in ammonia mixing ratio and the case of 100%, there is no so much difference in the value of pH. Even when 50 minutes have passed in the running time, pH lies between 9 and 10 without rising to an excessive extent. Conceivable as a factor that prevents the pH rising speed from becoming so fast in this manner is that local pH around fine bubble 40 is chiefly raised instead of raising pH of the entire treatment water, as described using FIG. 13 described above.

Example 4

Similar to Examples 2 and 3, Example 4 used the device 50 described above so that, while allowing hard water to flow into the treatment vessel 54 by operating the pump 66, treatment water after the lapse of a predetermined time was sampled as sample water by the water sampler 62. Similar to Example 3, sample water was sampled at every predetermined interval from activation of the pump 66, to measure various parameters. Furthermore, similar to Example 3, except treatment water sampled by the water sampler 62, all of treatment water supplied from the treatment vessel 54 to the first piping 56 was returned to the water storage tank 64, to allow circulation of treatment water. On the other hand, in Example 4, only one pattern of 70% was used as the ammonia mixing ratio in the mixture gas. Different from Examples 2 and 3, two types of hard water, hard water 1 (approx. 300 mg/L in hardness) and hard water 2 (approx. 1400 mg/L in hardness) were used as treatment water. Specific experimental conditions of Example 4 are shown as follows.
(Experimental Conditions)
  Treatment water type: hard water 1 and hard water 2
  Ammonia mixing ratio in mixture gas: 70%
  Treatment water flowrate: 2.6 L/min
  Mixture gas flowrate: 0.03 L/min
  Sample water measurement items: pH, Ca hardness (mg/L), and total carbonate concentration (mg/L)

Experimental results by Example 4 are shown in FIGS. 18A, 18B, 18C, and 18D.

Figure 18A:
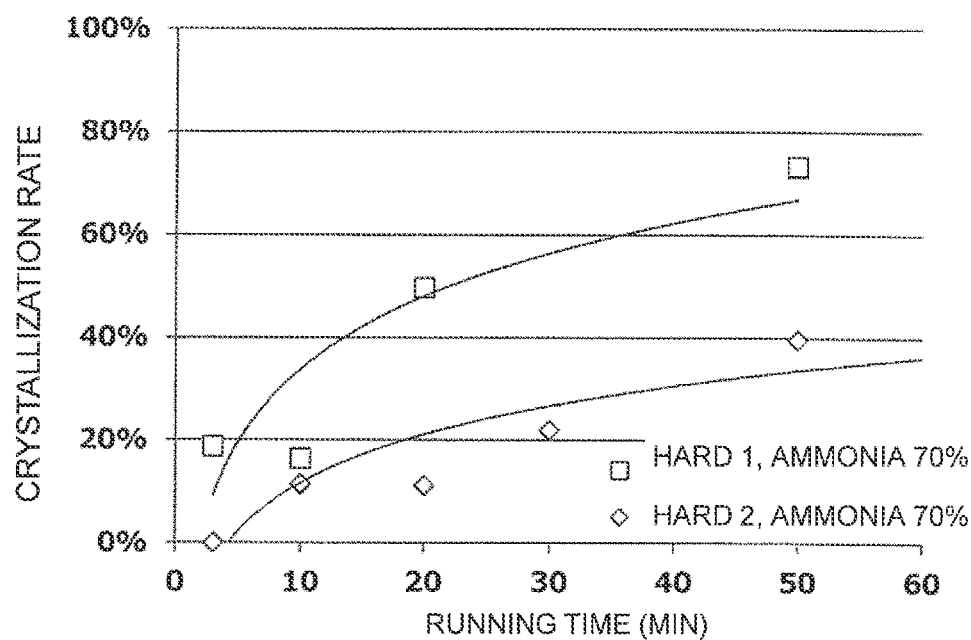
FIG. 18A is a view showing a result of Example 4 of the third embodiment.
Figure 18B:
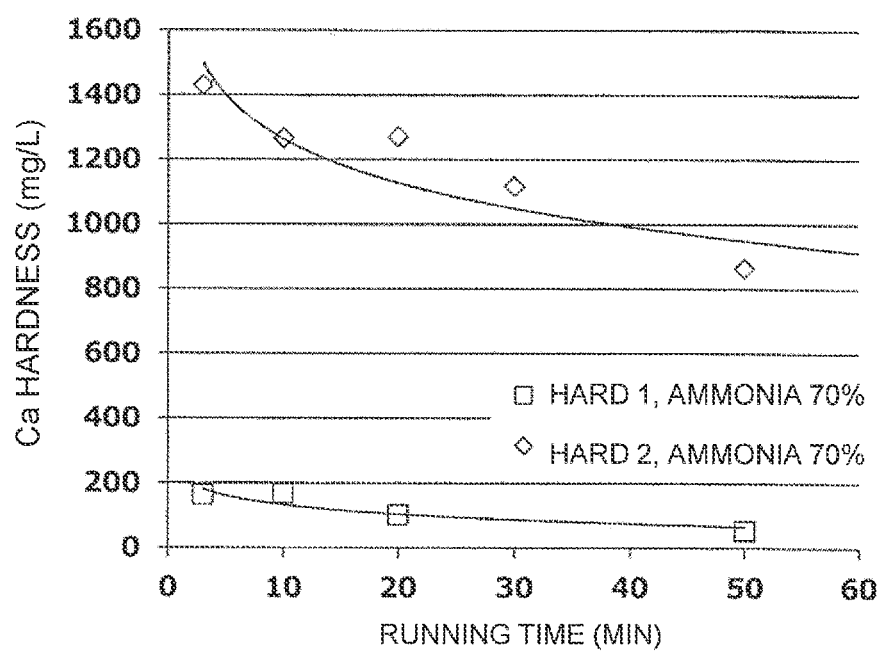
FIG. 18B is a view showing a result of Example 4 of the third embodiment.
Figure 18C:
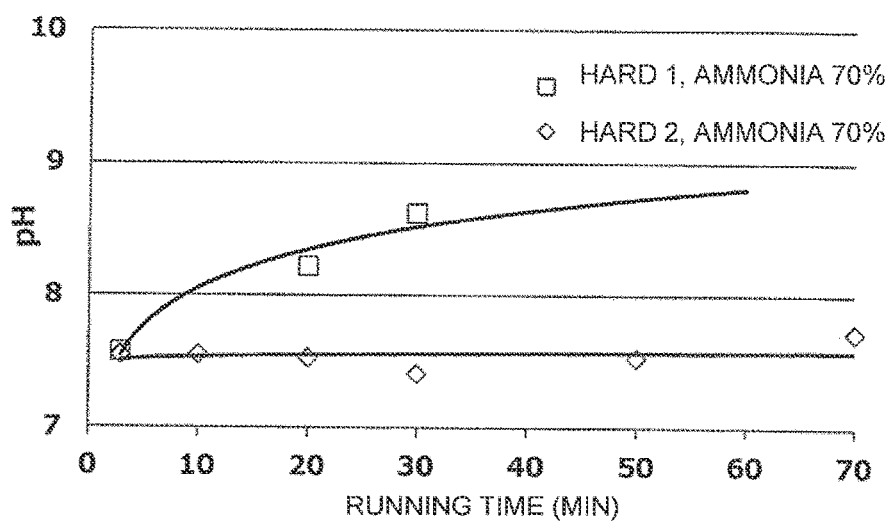
FIG. 18C is a view showing a result of Example 4 of the third embodiment.
Figure 18D:
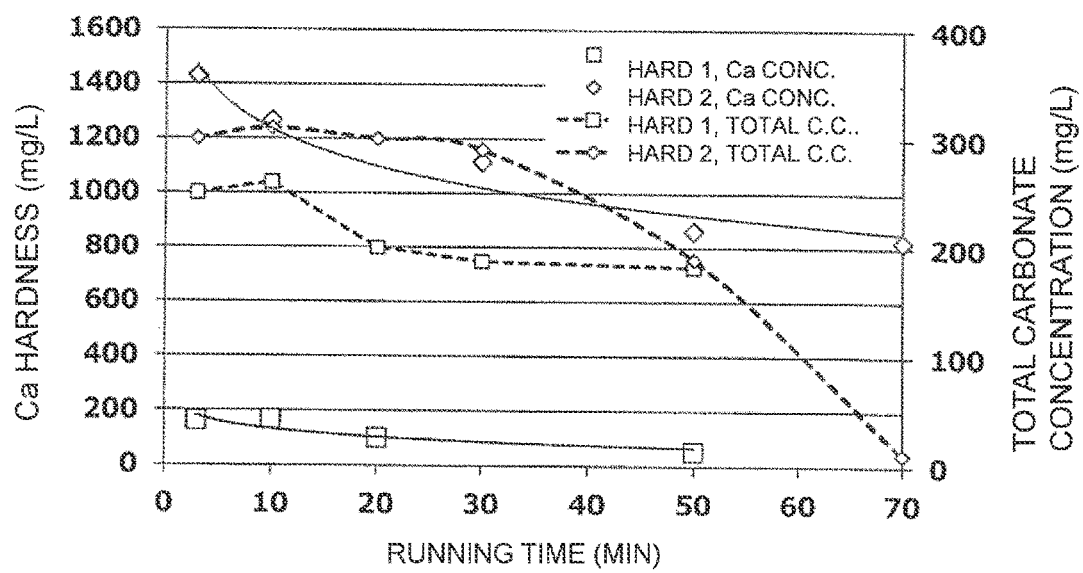
FIG. 18D is a view showing a result of Example 4 of the third embodiment.

In FIG. 18A, the horizontal axis represents running time (min) of the pump 66, while the vertical axis represents crystallization rate (%) of sample water. In FIG. 18B, the horizontal axis represents running time (min) of the pump 66, while the vertical axis represents Ca hardness (mg/L) of sample water. In FIG. 18C, the horizontal axis represents running time (min) of the pump 66, while the vertical axis represents pH of sample water. FIG. 18D is a graph of FIG. 18B in which total carbonate concentration (mg/L) is added to the vertical axis.

As shown in FIGS. 18A and 18B, both hard water 1 and hard water 2 have a higher crystallization rate and a lower Ca hardness as the running time elapses. It can thus be seen that by projecting fine bubbles originating from the mixture gas, $Ca^{2+}$ as a metal component dissolving in hard water is crystallized as $CaCO_3$.

As shown in FIGS. 18A and 18C, it can be seen that between hard water 1 and hard water 2 there is a large difference in the rising speed of crystallization rate and the rising speed of pH. Specifically, hard water 1 has a faster rising speed of crystallization rate and pH than hard water 2. In this regard, the inventors of this application focused on "total carbonate concentration" (referred as "total C.C." in FIG. 18D) and considered based on data shown in FIG. 18D.

As shown in FIG. 18D, regarding the total carbonate concentration of hard water 1, the value is 150 to 200 mg/L when the running time is 50 min. That is, hard water 1 contains a large amount of $HCO_3^-$ and $CO_3^{2-}$. Note that the crystallization rate of hard water 1 when the running time is 50 min reaches 70 to 80% as shown in FIG. 18A. On the contrary, regarding the total carbonate concentration of hard water 2, the value is approx. 20 mg/L when the running time is 70 min. It can be seen that, as compared with hard water 1, hard water 2 has a significantly lower content of $HCO_3^-$ and $CO_3^{2-}$. The crystallization rate of hard water 2 when the running time is 70 min is expected to be approx. 40% according to data shown in FIG. 18A.

$HCO_3^-$ and $CO_3^{2-}$ function as components for crystallizing $Ca^{2+}$ as $CaCO_3$ as described in the principle of the first embodiment-3. It is considered that due to containing more quantity of such $HCO_3^-$ and $CO_3^{2-}$, hard water 1 is faster than hard water 2 in rising speed of crystallization rate.

The content of metal components contained in hard water 1 and 2 and the total carbonate concentration thereof are shown in Table 1 below.

1 and approx. 887 mg/L in hard water 2. That is, in hard water 1, the quantity of $CO_3^{2-}$ contained actually has a surplus of approx. 173 mg/L for the quantity of $CO_3^{2-}$ required for dissolution of Ca and Mg. This means that $CO_3^{2-}$ for crystallizing $Ca^{2+}$ is abundantly present when projecting the mixture gas in the form of fine bubbles. On the contrary, in hard water 2, the quantity of $CO_3^{2-}$ contained actually has a shortage of approx. 515 mg/L for the quantity of $CO_3^{2-}$ required for dissolution of Ca and Mg. It is hereby conceivable that crystallization is not accelerated since $CO_3^{2-}$ for crystallizing $Ca^{2+}$ is low when projecting the mixture gas in the form of fine bubbles.

From the above result, it is conceivable that if abundant carbonic acid such as $HCO_3^-$ and $CO_3^{2-}$ is contained in hard water to be treated, the rising speed of crystallization can be improved. Based on this, in order to increase the total quantity of carbonic acid in hard water, carbonic-acid gas may be projected into hard water prior to projecting fine bubbles. Specifically, carbonic-acid gas generating means generating carbonic-acid gas may further be disposed. Then, before supplying fine bubbles generated by the fine bubble generating means to hard water, carbonic-acid gas may be generated by the carbonic-acid gas generating means for supply into hard water. It is hereby conceivable that crystallization of metal components in hard water can be accelerated.

As described above, according to Example 2-4 of the third embodiment, by setting such that the amount of substance of ammonia becomes larger than the amount of substance of nitrogen in the mixture gas, crystallization of metal components can be accelerated. Furthermore, by setting the mixing ratio of ammonia in the mixture gas to 70% or more, crystallization of metal components can be accelerated to a great extent.

Although the present invention has hereinabove been described giving the embodiments described above, the present invention is not limited to the above-described embodiments. Although in the above first and second embodiments, for example, the case has been described where the fine bubble generation device 2 has a configuration shown in FIG. 4, such a case is not limitative. As long as having the fine bubble generating means 6 generating fine

TABLE 1

|  | Content (mg/L) | | | Quantity of $CO_3^{2-}$ Required for Dissolution (mg/L) | | | Surplus Quantity |
| --- | --- | --- | --- | --- | --- | --- | --- |
|  | Ca | Mg | $CO_3^{2-}$ | Ca | Mg | Total | (mg/L) |
| Molecular Weight | 40 | 24.3 | 60 |  | 60 |  |  |
| Contrex | 468 | 74.8 | 372 | 702 | 184.691358 | 886.691358 | −514.691 |
| Evian | 80 | 26 | 357 | 120 | 64.19753086 | 184.1975309 | 172.8025 |

As shown in Table 1, the contents of Ca, Mg, and $CO_3^{2-}$ per unit volume contained in Evian (registered trademark) that is hard water 1 are 80 mg/L, 26 mg/L, and 357 mg/L, respectively. The contents of Ca, Mg, and $CO_3^{2-}$ per unit volume contained in Contrex (registered trademark) that is hard water 2 are 468 mg/L, 74.2 mg/L, and 372 mg/L, respectively. In this manner, the contents of $CO_3^{2-}$ per unit volume contained in hard water 1 and hard water 2 are 357 mg/L and 372 mg/L that are almost the same. On the contrary, the quantities of $CO_3^{2-}$ required for dissolution of Ca and Mg with respect to the contents of Ca and Mg contained in hard water are approx. 184 mg/L in hard water bubbles and as long as capable of supplying the generated fine bubbles into hard water, any configuration may be employed.

Although in the above first and second embodiments, the case has been described where metal components obtained by crystallizing and precipitating metal ions adhered to surfaces of fine bubbles are separated by centrifugation in the treatment vessel 8, such a case is not limitative. For example, with metal ions adsorbed on fine bubbles, fine bubbles rising upward of the treatment vessel 8 may be discharged so that metal ions are removed intactly from hard water. Alternatively, with metal ions adsorbed on fine bubbles, centrifugal separation may be performed so that bubbles with small specific gravity are gathered in the center and then recovered whereby metal ions are removed intactly from hard water. In this manner, also in the method of removing metal ions from hard water by discharging fine bubbles adsorbing metal ions from hard water, hardness in hard water can be decreased to manufacture soft water. As compared with the case of precipitating metal ions as crystals for separation, metal ions can be removed from hard water in a short time.

Although in the above first and second embodiments, the case has been described where the ion removal device 2 is a water softening device that softens hard water, such a case is not limitative. As long as the hardness of hard water can be lowered by decreasing the number of metal ions in hard water, water softening is not inevitable.

Although in the above first and second embodiments, the case has been described where the ion removal device 2 includes the separating means 10, it may not include the separating means 10 without being limited to such a case. Although the case has been described where the separating means 10 is configured from the end portion 4a of the hard water supply piping 4 and adsorption plate 11, any configuration may be employed as long as metal ions and metal components are separated from hard water, without being limited to such a case.

Although in the above first and second embodiments, the case has been described where the end portion 4a of the hard water supply piping 4 ejects water in a direction offset from the central axis of the treatment vessel 8 so that a swirling flow forms in liquid ejected to the treatment vessel 8, such a case is not limitative. For example, any swirling flow generating means may be employed such as disposing a rotary spring driven by a motor at a lower portion of the treatment vessel 8 so that rotation of the rotary spring forcibly brings about a swirling flow within the treatment vessel 8.

Although in the above first and second embodiments, the case has been described where fine bubbles are generated using air or nitrogen in the water softening treatment, any gases other than air and nitrogen may be used to generate fine bubbles, without being limited to such a case.

Although in the above first and second embodiments, the case has been described where fine bubbles are generated using carbon dioxide in the regeneration treatment, any gases other than carbon dioxide may be used to generate fine bubbles, without being limited to such a case.

Although in the above first and second embodiments, the case has been described where only fine bubbles are supplied into hard water, another gas in addition to fine bubbles may further be added, without being limited to such a case. Another gas may be supplied in the form of fine bubbles or may be supplied as normal bubbles, instead of fine bubbles.

Although in the above third embodiment, the case has been described of using fine bubbles in which two types of gases, the first gas as a basic gas and the second gas with property of slower dissolution speed than the first gas are mixed, another gas may be mixed in addition to such two types of gases. That is, use may be made of fine bubbles originating from a mixture gas in which two or more types of gases including the first gas and the second gas are mixed.

It is to be noted that by properly combining any embodiments among the above various embodiments and variants, their own respective effects can be presented.

Although referring to the accompanying drawings, this disclosure has fully been described with respect to the preferred embodiments, various variations and modifications are apparent to those skilled in the art. Such variations and modifications are to be understood as encompassed within the scope of this disclosure defined by appended claims unless they depart therefrom. Changes in combination and order of elements in each embodiment can be implemented without departing from the scope and idea of this disclosure.

According to an ion-exchange resin regeneration device of the present invention, it is possible to remove hard water components containing metal ions from drained water at the time of regeneration, regenerate salt water from drained water, or discharge it intactly. Thus, the ion-exchange resin can efficiently be regenerated.

EXPLANATIONS OF LETTERS OR NUMERALS 1 hard water component crystallizing means
2 ion removal device
3 salt water
3a regenerated salt water
4 hard water supply piping
4a end portion
5 salt water tank
5a regenerated salt water tank
6 fine bubble generating means
8 treatment vessel
9 drained water (salt water+calcium ion)
10 separating means
11 adsorption plate
12 soft water drawing piping
14 separated water discharge piping
15 salt water flowing means
15a tube
16 chemical agent projecting means
17 ion-exchange resin
18 ion-exchange resin container
19 control valve
20 device
21 hard water
22 water vessel
22a bottom surface
22b water surface
23 fine bubble
24 gas supply part
25 first piping
26 fine bubble generation part
27 second piping
28 pump
30 first water intake part
32 second water intake part
34 metal ion concentration detector
36 ion-exchange resin regeneration system
40 fine bubble
42 crystal
D1 distance from first water intake part to second water intake part
50 device
52 mixture gas supply part
54 treatment vessel
56 first piping
58 second piping
60 water sampling valve
62 water sampler
64 water storage tank
66 pump
68 flow regulating valve
70 flowmeter 72 ammonia supply source
74 nitrogen supply source
76 mixing ratio regulating valve
78 supply piping
80 fine bubble supply part
82 treatment water
84 crystal
85 hard water
86 soft water
87 calcium ion
88 sodium ion

The invention claimed is:

1. An ion-exchange resin regeneration system comprising:
a tube through which an aqueous sodium chloride solution or an aqueous potassium chloride solution flows into a container storing ion-exchange resin; and
hard water component crystallizing means that crystallizes and removes hard water components containing metal ions from drained water arising from the ion-exchange resin through which the aqueous sodium chloride solution or the aqueous potassium chloride solution has flowed;
wherein the hard water component crystallizing means includes an ion removal device that generates fine bubbles and supplies the fine bubbles into the drained water, to thereby allow metal ions in the drained water to be adsorbed on the fine bubbles, the fine bubbles each having a diameter of 100 μm or less.

2. The ion-exchange resin regeneration system of claim 1, further comprising:
separating means that separates crystals of hard water components crystallized and precipitated.

* * * * *